United States Patent
Horn et al.

(10) Patent No.: US 11,973,552 B2
(45) Date of Patent: Apr. 30, 2024

(54) ORBITAL ANGULAR MOMENTUM SIGNALING

(71) Applicant: QUALCOMM Incorporated, San Diego, CA (US)

(72) Inventors: Idan Michael Horn, Hod Hasharon (IL); Danlu Zhang, San Diego, CA (US); Shay Landis, Hod Hasharon (IL); Yehonatan Dallal, Kfar Saba (IL)

(73) Assignee: QUALCOMM Incorporated, San Diego, CA (US)

( * ) Notice: Subject to any disclaimer, the term of this patent is extended or adjusted under 35 U.S.C. 154(b) by 415 days.

(21) Appl. No.: 17/481,017

(22) Filed: Sep. 21, 2021

(65) Prior Publication Data

US 2023/0085759 A1    Mar. 23, 2023

(51) Int. Cl.
*H04B 7/06* (2006.01)
*H04W 72/044* (2023.01)
*H04W 72/0446* (2023.01)
*H04W 72/23* (2023.01)

(52) U.S. Cl.
CPC ...... *H04B 7/0617* (2013.01); *H04W 72/0446* (2013.01); *H04W 72/046* (2013.01); *H04W 72/23* (2023.01)

(58) Field of Classification Search
CPC .. H04B 7/0617; H04W 72/23; H04W 72/046; H04W 72/0446
See application file for complete search history.

(56) References Cited

U.S. PATENT DOCUMENTS

| | | | |
|---|---|---|---|
| 11,336,008 B2* | 5/2022 | Hirabe | H01Q 3/16 |
| 2021/0051658 A1* | 2/2021 | Park | H04W 16/14 |
| 2021/0068163 A1* | 3/2021 | Lee | H04W 74/006 |
| 2021/0105671 A1* | 4/2021 | Van Der Velde | H04W 36/18 |
| 2022/0295530 A1* | 9/2022 | Lee | H04L 5/0094 |
| 2022/0393930 A1* | 12/2022 | Nasiri Khormuji | H04L 27/3411 |

* cited by examiner

*Primary Examiner* — Mewale A Ambaye
(74) *Attorney, Agent, or Firm* — Holland & Hart LLP

(57) ABSTRACT

Methods, systems, and devices for wireless communications are described. A base station may determine to enable orbital angular momentum (OAM) beamforming for communications with a user equipment (UE), for example, based on one or more communications parameters and receiving a message from the UE indicating a capability of the UE to use OAM beamforming. The base station may transmit control signaling to the UE indicating that OAM beamforming is enabled. In some examples, the base station may transmit control signaling indicating an OAM configuration, which may be for a same slot in which the control signaling is transmitted or a subsequent slot. The base station may transmit a downlink transmission to the UE via OAM beamforming. In some examples, the base station may estimate and correct misalignment associated with OAM beamforming. In some examples, the base station may disable OAM beamforming and transmit an indication that OAM beamforming is disabled.

30 Claims, 18 Drawing Sheets

ORBITAL ANGULAR MOMENTUM SIGNALING

FIELD OF TECHNOLOGY

The following relates to wireless communications, including orbital angular momentum signaling.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some systems, wireless devices such as base stations and UEs may operate in relatively high frequency bands, such as millimeter wave (mmW) and higher frequency ranges. High frequency bands may support relatively higher throughput, but may also be associated with increased path loss; in some examples, wireless devices may assuage path loss by utilizing multiple antennas and/or multiple beams. Some systems may support communications between devices using orbital angular momentum (OAM) beams.

SUMMARY

The described techniques relate to improved methods, systems, devices, and apparatuses that support orbital angular momentum (OAM) signaling. Generally, the described techniques provide for a user equipment (UE) and a base station to dynamically configure and enable (and disable) communications using OAM beamforming. For example, a UE may transmit an indication of a capability of the UE to use OAM beamforming. Based on the capability, the base station may indicate (e.g., via control signaling), to the UE, that OAM beamforming is enabled. In some examples, the control signaling may include an OAM configuration, which may indicate one or more communications parameters. Subsequent communications between the UE and the base station may be performed using OAM beamforming.

In some instances, the base station and the UE may enable OAM beamforming in a relatively short time frame. For example, the base station may transmit, in a slot, an indication that OAM beamforming is enabled for the same slot. The indication may be transmitted in a preamble at the beginning of the slot, and the slot may include (e.g., after the preamble) a downlink transmission using OAM beamforming. The preamble may include one or more communications parameters. A method for wireless communications at a base station is described. The method may include receiving, from a UE, a message indicating a UE capability to use OAM beamforming, determining, based on the UE capability and one or more communications parameters, to enable OAM beamforming for communications with the UE, transmitting, to the UE, control signaling including an indication that OAM beamforming is enabled, and transmitting a downlink transmission to the UE using a set of multiple beams via OAM beamforming.

An apparatus for wireless communications at a base station is described. The apparatus may include a processor, memory coupled with the processor, and instructions stored in the memory. The instructions may be executable by the processor to cause the apparatus to receive, from a UE, a message indicating a UE capability to use OAM beamforming, determine, based on the UE capability and one or more communications parameters, to enable OAM beamforming for communications with the UE, transmit, to the UE, control signaling including an indication that OAM beamforming is enabled, and transmit a downlink transmission to the UE using a set of multiple beams via OAM beamforming.

Another apparatus for wireless communications at a base station is described. The apparatus may include means for receiving, from a UE, a message indicating a UE capability to use OAM beamforming, means for determining, based on the UE capability and one or more communications parameters, to enable OAM beamforming for communications with the UE, means for transmitting, to the UE, control signaling including an indication that OAM beamforming is enabled, and means for transmitting a downlink transmission to the UE using a set of multiple beams via OAM beamforming.

A non-transitory computer-readable medium storing code for wireless communications at a base station is described. The code may include instructions executable by a processor to receive, from a UE, a message indicating a UE capability to use OAM beamforming, determine, based on the UE capability and one or more communications parameters, to enable OAM beamforming for communications with the UE, transmit, to the UE, control signaling including an indication that OAM beamforming is enabled, and transmit a downlink transmission to the UE using a set of multiple beams via OAM beamforming.

Some examples of the method, apparatuses, and non-transitory computer-readable medium described herein may further include operations, features, means, or instructions for transmitting an OAM configuration within a downlink control information (DCI) message as part of the control signaling.

In some examples of the method, apparatuses, and non-transitory computer-readable medium described herein, the OAM configuration indicates a modulation and coding scheme (MCS) for each beam of the set of multiple beams, a resource allocation for each beam of the set of multiple beams, a quantity of the set of multiple beams, an OAM index for each beam of the set of multiple beams, or a combination thereof.

In some examples of the method, apparatuses, and non-transitory computer-readable medium described herein, the OAM configuration may be for either a same slot in which the control signaling may be transmitted or a subsequent slot, in accordance with one or more time offset values included in the control signaling.

In some examples of the method, apparatuses, and non-transitory computer-readable medium described herein, the DCI message includes fields for configuring the same slot for OAM beamforming.

In some examples of the method, apparatuses, and non-transitory computer-readable medium described herein, a medium access control (MAC) control element (CE) includes information for configuring the subsequent slot for OAM beamforming.

In some examples of the method, apparatuses, and non-transitory computer-readable medium described herein, transmitting the control signaling may include operations, features, means, or instructions for transmitting the indication in a preamble at a beginning of a slot that includes the downlink transmission.

In some examples of the method, apparatuses, and non-transitory computer-readable medium described herein, transmitting the control signaling may include operations, features, means, or instructions for transmitting the control signaling which may be indicative of an OAM index for each beam of the set of multiple beams, a radio network temporary identifier (RNTI) associated with the UE, or both.

In some examples of the method, apparatuses, and non-transitory computer-readable medium described herein, the communications parameters include one or more channel conditions, a channel rank, a misalignment associated with the OAM beamforming, a speed of the UE, a distance between the base station and the UE, a throughput of the UE, or a combination thereof.

Some examples of the method, apparatuses, and non-transitory computer-readable medium described herein may further include operations, features, means, or instructions for determining the misalignment associated with the channel based on receiving a misalignment report from the UE, estimating the misalignment, or a combination thereof.

Some examples of the method, apparatuses, and non-transitory computer-readable medium described herein may further include operations, features, means, or instructions for determining that a misalignment associated with the OAM beamforming may be correctable by the base station, correcting the misalignment based on the determining, and estimating a remaining misalignment associated with the OAM beamforming, where determining to enable OAM beamforming may be based on the remaining misalignment.

Some examples of the method, apparatuses, and non-transitory computer-readable medium described herein may further include operations, features, means, or instructions for receiving, from the UE, a request message to enable OAM beamforming, where determining to enable OAM beamforming may be based on receiving the request message.

In some examples of the method, apparatuses, and non-transitory computer-readable medium described herein, the control signaling includes radio resource control (RRC) signaling, a MAC-CE, DCI, or a combination thereof.

In some examples of the method, apparatuses, and non-transitory computer-readable medium described herein, the control signaling may be associated with an OAM index of zero.

Some examples of the method, apparatuses, and non-transitory computer-readable medium described herein may further include operations, features, means, or instructions for determining to disable OAM beamforming for communications with the UE, transmitting, to the UE, additional control signaling that indicates that OAM beamforming may be disabled, and communicating with the UE using non-OAM beamforming.

In some examples of the method, apparatuses, and non-transitory computer-readable medium described herein, the message further indicates an additional UE capability to perform digital beamforming.

A method for wireless communications at a UE is described. The method may include transmitting, to a base station, a message indicating a UE capability of the UE to use OAM beamforming, receiving, from the base station, control signaling including an indication that OAM beamforming is enabled, and receiving a downlink transmission from the base station using a set of multiple beams via OAM beamforming.

An apparatus for wireless communications at a UE is described. The apparatus may include a processor, memory coupled with the processor, and instructions stored in the memory. The instructions may be executable by the processor to cause the apparatus to transmit, to a base station, a message indicating a UE capability of the UE to use OAM beamforming, receive, from the base station, control signaling including an indication that OAM beamforming is enabled, and receive a downlink transmission from the base station using a set of multiple beams via OAM beamforming.

Another apparatus for wireless communications at a UE is described. The apparatus may include means for transmitting, to a base station, a message indicating a UE capability of the UE to use OAM beamforming, means for receiving, from the base station, control signaling including an indication that OAM beamforming is enabled, and means for receiving a downlink transmission from the base station using a set of multiple beams via OAM beamforming.

A non-transitory computer-readable medium storing code for wireless communications at a UE is described. The code may include instructions executable by a processor to transmit, to a base station, a message indicating a UE capability of the UE to use OAM beamforming, receive, from the base station, control signaling including an indication that OAM beamforming is enabled, and receive a downlink transmission from the base station using a set of multiple beams via OAM beamforming.

Some examples of the method, apparatuses, and non-transitory computer-readable medium described herein may further include operations, features, means, or instructions for receiving an OAM configuration within a DCI message as part of the control signaling.

In some examples of the method, apparatuses, and non-transitory computer-readable medium described herein, the OAM configuration indicates an MCS for each beam of the set of multiple beams, a resource allocation for each beam of the set of multiple beams, a quantity of the set of multiple beams, an OAM index for each beam of the set of multiple beams, or a combination thereof.

In some examples of the method, apparatuses, and non-transitory computer-readable medium described herein, the OAM configuration may be for either a same slot in which the control signaling may be transmitted or a subsequent slot, in accordance with one or more time offset values included in the control signaling.

In some examples of the method, apparatuses, and non-transitory computer-readable medium described herein, the DCI message includes fields for configuring the same slot for OAM beamforming.

In some examples of the method, apparatuses, and non-transitory computer-readable medium described herein, a MAC-CE includes information for configuring the subsequent slot for OAM beamforming.

In some examples of the method, apparatuses, and non-transitory computer-readable medium described herein, receiving the control signaling may include operations, features, means, or instructions for receiving the indication in a preamble at a beginning of a slot that includes the downlink transmission.

In some examples of the method, apparatuses, and non-transitory computer-readable medium described herein, receiving the control signaling may include operations, features, means, or instructions for receiving the control signaling which may be indicative of an OAM index for each beam of the set of multiple beams, an RNTI associated with the UE, or both.

In some examples of the method, apparatuses, and non-transitory computer-readable medium described herein, the communications parameters include one or more channel conditions, a channel rank, a misalignment associated with the OAM beamforming, a speed of the UE, a distance between the base station and the UE, a throughput of the UE, or a combination thereof.

Some examples of the method, apparatuses, and non-transitory computer-readable medium described herein may further include operations, features, means, or instructions for transmitting, to the base station, a misalignment report.

Some examples of the method, apparatuses, and non-transitory computer-readable medium described herein may further include operations, features, means, or instructions for transmitting, to the base station, a request message to enable OAM beamforming.

In some examples of the method, apparatuses, and non-transitory computer-readable medium described herein, the control signaling includes RRC signaling, a MAC-CE, DCI, or a combination thereof.

In some examples of the method, apparatuses, and non-transitory computer-readable medium described herein, the control signaling may be associated with an OAM index of zero.

Some examples of the method, apparatuses, and non-transitory computer-readable medium described herein may further include operations, features, means, or instructions for receiving, from the base station, additional control signaling that indicates that OAM beamforming may be disabled and communicating with the base station using non-OAM beamforming.

In some examples of the method, apparatuses, and non-transitory computer-readable medium described herein, the message further indicates an additional UE capability to perform digital beamforming.

DETAILED DESCRIPTION

Figure 1:
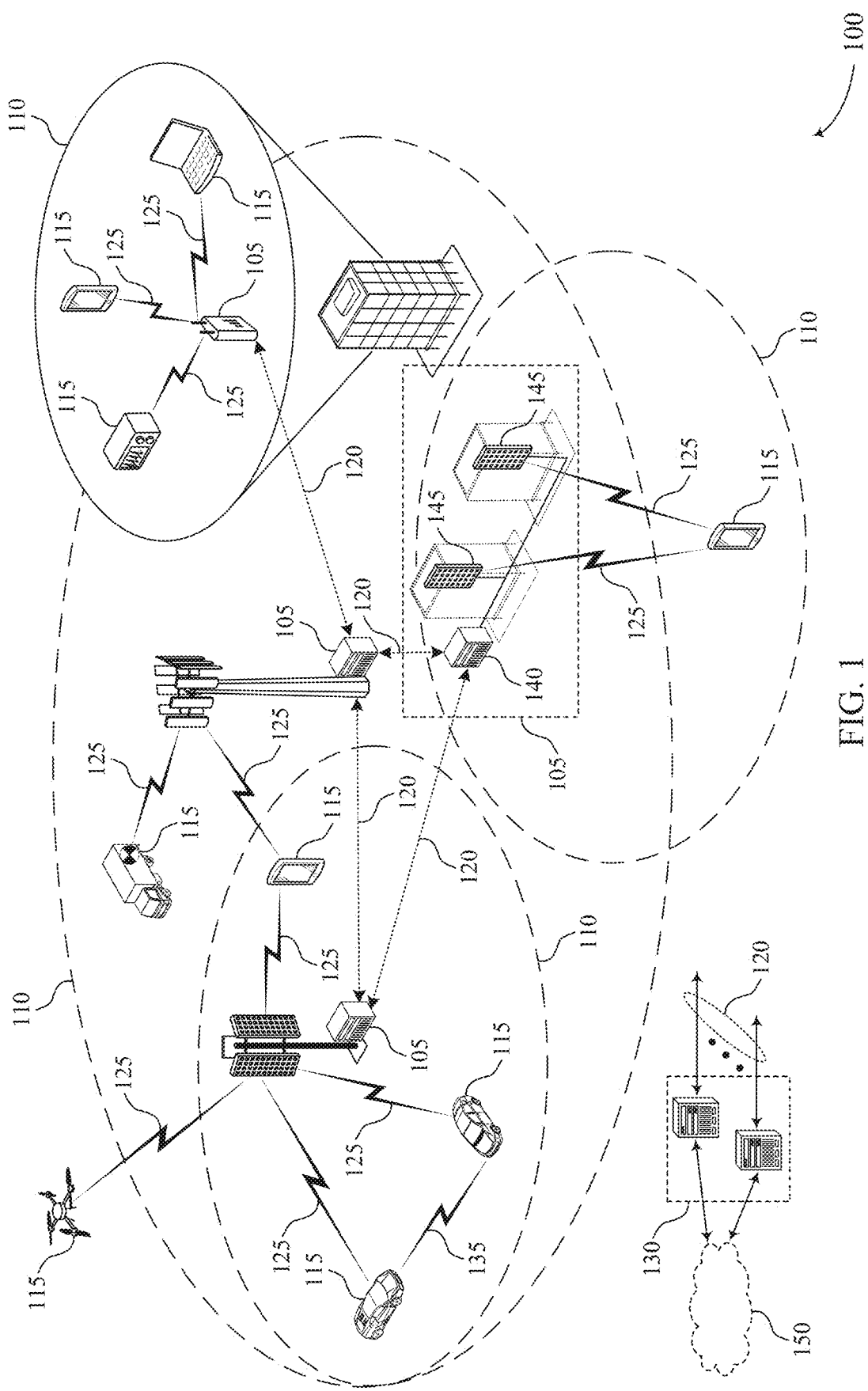
FIG. 1 illustrates an example of a wireless communications system that supports orbital angular momentum (OAM) signaling in accordance with aspects of the present disclosure.

In some wireless communications systems, wireless devices, such as base stations or user equipments (UEs), or both, may communicate directionally, for example, using beams to orient communication signals over one or more directions. In some cases, orbital angular momentum (OAM) communication may provide more efficient communications than other types of communication, for example, for fixed communication that occurs at a distance below a threshold (e.g., backhaul or access communications) and/or for communication that occurs at a particular range of frequencies (e.g., frequencies within the terahertz range or below the terahertz range). In OAM-capable communications systems, the wireless devices may communicate using OAM beams (e.g., via OAM beamforming), which, in addition to providing signal directionality and frequency diversity, may also provide additional dimensions for signal or channel multiplexing. In some aspects, for example, such additional dimensions may include an OAM state, a polarization, or both, where OAM beams with different OAM states, polarizations, or both may be orthogonal to each other. As such, OAM beams with different OAM states or polarizations may be multiplexed together to increase the capacity of an OAM link. In some cases, a wireless device may use spiral phase plate (SPP) or uniform circular array (UCA)-based methodologies to generate OAM beams.

In some examples, one or more wireless devices in a wireless communications system may be capable of OAM beamforming in addition to other beamforming methodologies. OAM beamforming may increase throughput and efficiency in the system, but may be sensitive to channel conditions, misalignment between wireless devices, relative distance between wireless devices, or motion between wireless devices. For instance, OAM beams may suffer performance degradation in poor channel conditions, at relatively high distances between wireless devices, or if a wireless device is traveling at a relatively high speeds. Additionally, in some examples, a device may have limited OAM capabilities (e.g., based on a hardware configuration at the device). Accordingly, the techniques described herein may enable wireless devices to dynamically enable or disable OAM beamforming based on one or more criteria.

A wireless device, such as a base station, may determine to enable OAM beamforming for communications with a UE, e.g., based on capability information indicated by the UE and one or more associated communications parameters. The base station may transmit (e.g., via control signaling), to the UE, an indication that OAM beamforming is enabled, and may transmit one or more subsequent downlink transmissions using a set of OAM beams (e.g., via OAM beamforming). In some examples, the control signaling may include an OAM configuration that indicates one or more parameters, which may be associated with the set of OAM beams or with respective individual OAM beams of the set of OAM beams. For instance, the OAM configuration may indicate a quantity of the set of OAM beams, a modulation and coding scheme (MCS) for each OAM beam of the set of OAM beams, an OAM index for each OAM beam of the set of OAM beams, or the like.

In some examples, the techniques described herein may support fast enabling of OAM beamforming, where the base station enables OAM beamforming for a same slot in which the control signaling is transmitted and the control signaling may include information for configuring the same slot. In such examples, the indication that OAM beamforming is enabled may be transmitted in a preamble at the beginning of the slot, such that the UE may decode and identify OAM beamforming information within a relatively short time duration (e.g., in order to successfully receive the subsequent OAM beamformed transmission in the same slot).

Particular aspects of the subject matter described in this disclosure may be implemented to realize one or more of the following potential advantages. The techniques employed by the described communication devices may provide benefits and enhancements to the operation of the communication devices, including supporting orthogonality between transmissions by using OAM beamforming, which may result in communication efficiencies, among other benefits. For example, transmitting messages orthogonally may reduce inter-transmission interference. Further, by supporting dynamic enabling or disabling of OAM beamforming, devices in a wireless communications system may adapt beamforming methodologies according to various parameters. For instance, devices may enable OAM beamforming for increased throughput and frequency diversity, or may disable OAM beamforming (e.g., and enable another type of beamforming) for increased robustness. Accordingly, the techniques described herein support improvements to throughput, reliability for communications, spectral efficiency, higher data rates and, in some examples, low latency for communications, among other benefits.

Aspects of the disclosure are initially described in the context of wireless communications systems. Aspects of the disclosure are then discussed with reference to a helical structure, an OAM transmission scheme, a butler matrix, and a process flow. Aspects of the disclosure are further illustrated by and described with reference to apparatus diagrams, system diagrams, and flowcharts that relate to orbital angular momentum signaling.

FIG. 1 illustrates an example of a wireless communications system 100 that supports orbital angular momentum signaling in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_S=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-todevice (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some wireless communications systems, wireless devices, such as base stations 105 or UEs 115, or both, may communicate directionally, for example, using beams to orient communication signals over one or more directions. The wireless communications system 100 may be an example of or otherwise support an OAM-based communications system and a base station 105 and a UE 115 may be configured to communicate with one another (e.g., and/or with other devices in the wireless communications system 100) using OAM beams. For example, the base station 105 and the UE 115 may use OAM beamforming for MIMO communications, such as line-of-sight (LoS) MIMO communications, where the base station 105 and the UE 115 transmit and receive signals on different spatial layers using multiple antennas.

OAM communications may provide more efficient communications than other types of communication, for instance, for fixed communication that occurs at a distance below a threshold (e.g., backhaul or access communications) and/or for communication that occurs at a particular range of frequencies (e.g., frequencies within the terahertz range or below the terahertz range). Additionally, or alternatively, OAM communications may provide reduced interference for devices utilizing multiple antennas in a same physical space. For example, OAM beams associated with different phases may be orthogonal to one another, which may reduce interference between OAM beams; additionally, due to this orthogonality, OAM beams may support an increased number of antennas and relatively narrow beams, e.g., without suffering reduced diversity. In some examples, OAM communications may be used for wireless backhaul transmissions (e.g., from a base station 105 to a relay node), for fixed wireless access (e.g., from a base station 105 to a fixed UE 115 or for a customer-premises equipment or customer-provided equipment), for inter-device transmissions (e.g., from fixed UE to another fixed UE or as an inter-server connection in a data center), or any combination thereof.

An OAM beam may be an example of an electromagnetic wave generated using OAM beamforming and may have various properties. For instance, an OAM of the electromagnetic wave may be associated with a field spatial distribution of the electromagnetic wave, which may be in the form of a helical or twisted wavefront shape (e.g., in examples in which a light beam can be associated with a helical or twisted wavefront). For example, an electromagnetic wave (e.g., a light beam) may be in a helical mode (which may also be referred to as an OAM mode) and such helical modes may be characterized by a wavefront that is shaped as a helix with an optical vortex in the center (e.g., at the beam axis), where each helical mode is associated with a different helical wavefront structure. The helical modes (e.g., OAM modes, which may also be referred to as OAM states) may be defined or referred to by a mode index m, where a sign of the mode index m corresponds to a "handedness" (e.g., left or right) of the helix (or helices) and a magnitude of the mode index m (e.g., lml) corresponds to a quantity of distinct but interleaved helices of the electromagnetic wave. Further details of OAM beams and associated properties are described in additional detail with reference to FIG. 3.

OAM communications may provide additional dimensions for signal multiplexing. In some aspects, for example, one additional dimension may include the state or the mode of the OAM beam, where different states or modes of OAM beams may be orthogonal to each other. As such, different OAM states or modes may be multiplexed together to increase the capacity of an OAM link. In some cases, a wireless device, such as a base station 105 or a UE 115, may use SPP or UCA based methodologies to generate an OAM beam. In some cases, a transmitting device and a receiving device may each be equipped with one or more antenna circles (e.g., UCAs) that may allow the transmitting device and the receiving device to communicate according to one or more OAM modes. Additionally, another additional dimension may include polarization. Since any OAM mode can be one of two polarizations (e.g., two linear polarizations (e.g., one horizontal and one vertical) or two circular and elliptical polarizations (e.g., clockwise and counter-clockwise)), polarization and OAM mode may be two independent properties of electromagnetic waves and two independent sources of degrees of freedom. In some cases, using a combination of different polarizations and multiple OAM modes may support an increased number (e.g., double) of data streams in OAM-based communications in MIMO compared to OAM-based communications that do not exploit polarization.

According to the techniques described herein, a base station 105 and a UE 115 may dynamically enable or disable OAM beamforming and may communicate with one another (e.g., or with other devices in the wireless communications system 100) accordingly. For instance, the base station 105 may enable OAM beamforming based on various communications patterns, such as channel conditions. In some cases, the UE 115 may transmit, to the base station 105, a request for OAM beamforming, and the base station 105 may enable OAM beamforming based on receiving the request. Additionally, or alternatively, the UE 115 may transmit an indication of capability information to the base station 105. Capability information may include, but is not limited to, a capability of the UE 115 to perform digital beamforming, to dynamically enable (e.g., and disable) OAM beamforming, to perform fast enabling of OAM beamforming, or some combination thereof, among other examples.

In some cases, the base station 105 may determine whether to enable OAM beamforming based on a misalignment associated with the OAM beamforming. For example, misalignment between respective antenna arrays of the base station 105 and the UE 115 may reduce the likelihood that communications are received successfully. In some cases, the UE 115 may transmit a misalignment report to the base station 105, while in other cases, the base station 105 may estimate the misalignment. As an example, the base station 105 may identify that the UE 115 is in motion and is traveling at a relatively high speed. In such examples, the speed of the UE 115 may increase the likelihood that misalignment in OAM communications may occur, such that the base station 105 may refrain from enabling OAM beamforming. In some cases, after identifying a misalignment, the base station 105 may correct the misalignment, if possible; if so, the base station 105 may estimate a remaining misalignment and may determine whether to enable OAM beamforming based on the remaining misalignment.

The base station 105 may transmit an indication (e.g., via control signaling, such as radio resource control (RRC) signaling, a media access control (MAC) control element (MAC-CE), downlink control information (DCI), or other examples) to the UE 115 that OAM beamforming is enabled. The UE 115 may receive subsequent communications (e.g., subsequent downlink transmissions) from the base station 105 using OAM beamforming. In some examples, the control signaling may include an OAM configuration that indicates one or more parameters associated with a set of OAM beams. For instance, the OAM configuration may indicate a quantity of the set of OAM beams, an MCS for each OAM beam of the set of OAM beams, an OAM index for each OAM beam of the set of OAM beams, a resource allocation for each OAM beam of the set of OAM beams, or the like.

In some examples, the base station 105 may enable OAM beamforming for a same slot in which the control signaling is transmitted, which may be referred to herein as fast enabling. In such examples, the control signaling may include information for configuring the same slot; the indication that OAM beamforming is enabled may be transmitted in a preamble at the beginning of the slot, such that the UE 115 may decode and identify OAM beamforming information within a relatively short time duration in order to successfully receive the subsequent OAM beamformed transmission in the same slot.

In some cases, the base station 105 may determine to disable OAM beamforming. For instance, varying (e.g., degrading) channel conditions may negatively impact performance of OAM communications, or as described above, the UE 115 may begin to travel at a relatively high speed, which may introduce significant misalignment. Additionally, or alternatively, a relative distance between the UE 115 and the base station 105 may have increased over time, such that OAM beamforming may not provide reliable communications. The base station 105 may transmit, to the UE 115, an indication (e.g., via control signaling) that OAM beamforming is disabled, and subsequent communications between the base station 105 and the UE 115 may use beamforming other than OAM beamforming.

Figure 2:
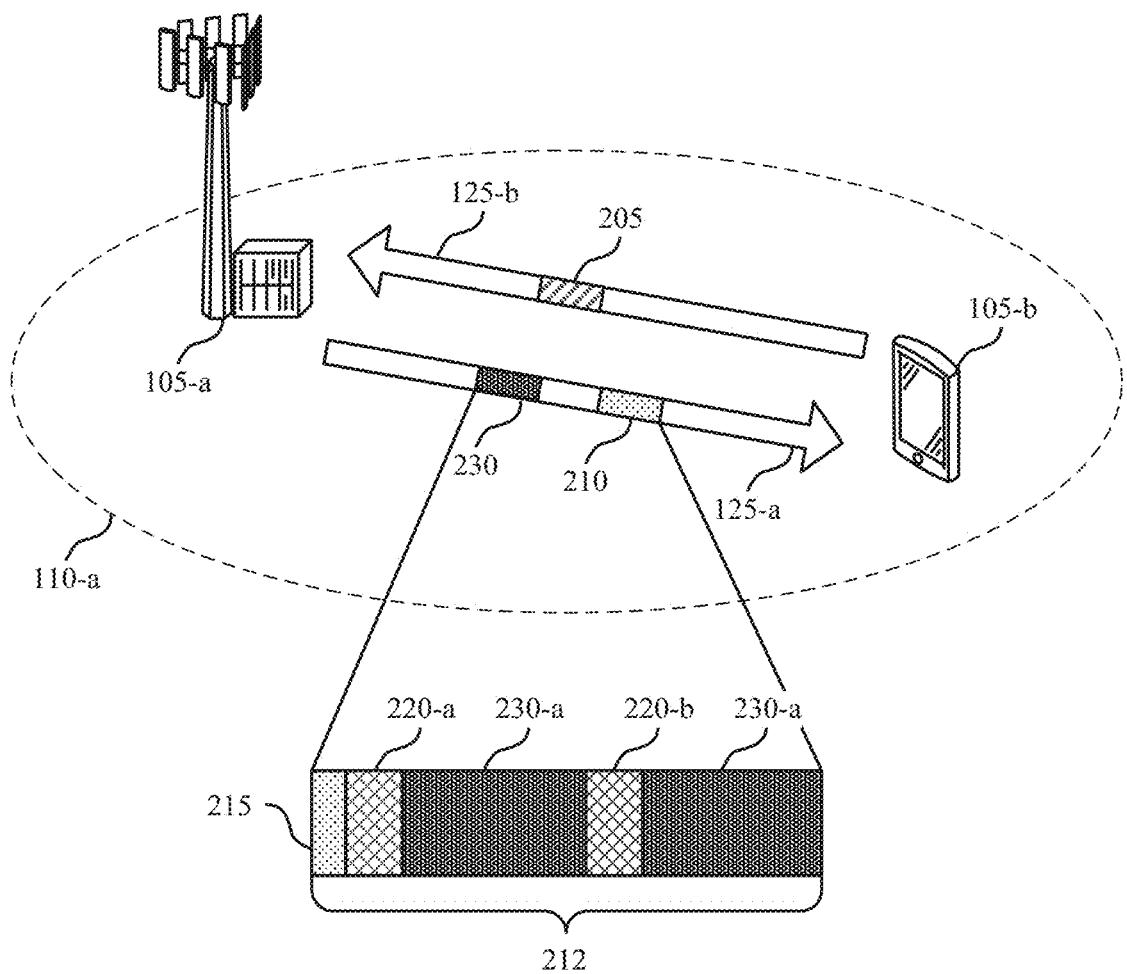
FIG. 2 illustrates an example of a wireless communications system that supports OAM signaling in accordance with aspects of the present disclosure.

FIG. 2 illustrates an example of a wireless communications system 200 that supports OAM signaling in accordance with aspects of the present disclosure. The wireless communications system 200 may illustrate communication between a base station 105-a and a UE 115-a, which may be examples of corresponding devices described herein. In some examples, the wireless communications system 200 (which may be an example of a sixth generation (6G) system, a fifth generation (5G) system, or other generation of system) may support OAM-based communications and, as such, the base station 105-a and the UE 115-a may transmit or receive OAM beams over communication links 125 (e.g., OAM links) within a geographic coverage area 110-a.

For example, the base station 105-a or the UE 115-a may support OAM-based communication by using the OAM of electromagnetic waves to distinguish between different signals. Electromagnetic waves transmitted and received in this manner may be referred to as OAM beams and may be generated by the base station 105-a or the UE 115-a using OAM beamforming, which is described in more detail with reference to FIGS. 3-5. OAM beams may be useful as a transmission scheme for line-of-sight transmissions in a wireless communication network, such as LoS MIMO. For example, OAM transmissions (also referred to herein as "OAM waveforms") may be useful for higher bands, such as the millimeter wave frequency band or higher frequency bands (e.g., FR2, FR4, etc.). When employing MIMO technology, each OAM mode index (e.g., as described with reference to FIG. 1) of an OAM transmission may correspond to an orthogonal carrier; carriers that are orthogonal to one another may be less likely to experience interference from one another. As MIMO communications rely on multiple antenna elements and/or antenna arrays at a base station 105 or UE 115, orthogonal beams may support an increased quantity of antennas and/or increasingly narrow beams while avoiding interference and reduced frequency diversity.

The techniques described herein may be implemented by the base station 105-a and the UE 115-a to support signaling for OAM communications in the wireless communications system 200. The base station 105-a may determine to enable OAM beamforming for communications with the UE 115-a via the communication links 125. For example, the base station 105-a may determine that one or more communications parameters may support OAM beamforming, such as channel conditions, a speed of the UE 115-a, a relative location or distance of the UE 115-a with respect to the base station 105-a, a throughput of the UE 115-a, a channel rank, a misalignment associated with OAM beamforming, or some combination thereof, among other examples. In some scenarios, OAM beamforming may be less reliable or useful than other beamforming methodologies. For instance, if the base station 105-a determines that a rank associated with the channel is relatively low (e.g., the channel supports a relatively low number of layers), other beamforming methodologies may be sufficient. Alternatively, if the UE 115-a is associated with a relatively high throughput, OAM beamforming may provide increased throughput as compared to other beamforming methodologies.

For further example, the base station 105-a may determine to enable OAM beamforming based on an associated misalignment. As discussed in more detail with reference to FIG. 3, OAM beams may be associated with particular characteristics such that successful transmission and reception relies on a threshold degree of alignment between antenna arrays of the base station 105-a and the UE 115-a. Accordingly, some scenarios or communications parameters may be associated with higher likelihoods of misalignment. However, in some examples, the base station 105-a may be capable of correcting misalignment. The base station 105-a may determine a misalignment, for instance, based on estimating a misalignment associated with OAM communications with the UE 115-a. Additionally, or alternatively, the UE 115-a may determine and transmit a misalignment report to the base station 105-a, and the base station 105-a may determine the misalignment based on the misalignment report. The base station 105-a may determine whether the misalignment is correctable. If the base station 105-a determines that the misalignment is not correctable, the base station 105-a may determine whether to enable OAM beamforming based on the misalignment (e.g., based on a threshold). Otherwise, the base station 105-a may correct the misalignment. The base station 105-a may estimate a remaining misalignment (e.g., after the correction) and may determine whether to enable OAM beamforming based on the remaining misalignment.

In some examples, misalignment associated with OAM communications may be based on a distance or speed at the UE 115-a. If the UE 115-a is far from the base station 105-a or is traveling at a relatively high speed, transmissions using OAM beamforming may be less likely to be successfully received by the UE 115-a. For example, as described in more detail with reference to FIG. 3, some OAM beams (e.g., associated with higher OAM index modes) may be associated with a relatively widespread energy pattern. In such examples, as the distance traveled by the OAM beam increases, a received signal power (e.g., a reference signal received power (RSRP)) at a receiving device (i.e., the UE 115-a) may decrease. Additionally, the speed of the UE 115-a may reduce the likelihood that an OAM beam associated with a higher OAM index mode is successfully received, or may increase the probability that a misalignment may occur.

In some cases, the UE 115-a may transmit a message 205 via the communication link 125-b that indicates a capability of the UE 115-a to use OAM beamforming. In some examples, the message 205 may indicate a capability of the UE 115-a to use fast enabling of OAM beamforming. Additionally, the message 205 may indicate a request, by the UE 115-a, to enable OAM beamforming. The base station 105-a may determine to enable OAM beamforming for communications with the UE 115-a based on the message 205 (e.g., based on the capability information, the request, or both).

The base station may transmit control signaling 210 to the UE 115-a via the communication link 125-a that includes an indication that OAM beamforming is enabled. The control signaling 210 may include or may be an example of a MAC-CE, DCI, or RRC signaling. In some cases, the base station 105-a may additionally transmit an OAM configuration in addition to or within the control signaling 210 via the communication link 125-b; the OAM configuration may be included as part of DCI. In some examples, the control signaling 210 and the OAM configuration may be based on a slot for which the OAM beamforming is enabled. For example, the base station 105-a may transmit control signaling 210 in a slot indicating that OAM beamforming is enabled for a subsequent slot, and the OAM configuration for the subsequent slot may be indicated as part of a MAC-CE (e.g., the MAC-CE includes information for configuring the subsequent slot for OAM beamforming). In this example, the control signaling 210 may include or be an example of DCI, which may include an indication of the subsequent slot (e.g., based on one or more time offset values of the DCI, such as a value of k0).

The OAM configuration may include various parameters according to which the downlink transmission 230 is transmitted and received using OAM beamforming. For example, the base station 105-a may transmit the downlink transmission 230 using multiple OAM beams, and the OAM configuration may include an indication of the quantity of OAM beams. In some examples, the OAM configuration may indicate an OAM mode index for each OAM beam. In some cases, the OAM configuration may include an indication of an MCS associated with each respective OAM beam, where the MCS associated with an OAM beam may correspond to an OAM mode index of the OAM beam. In some instances, the UE 115-a may determine OAM mode indexes for respective OAM beams based on the corresponding indicated MCS or based on other parameters associated with the MCS (e.g., an offset value, an index, or the like). Additionally, or alternatively, the OAM configuration may indicate a resource allocation for each OAM beam.

In other examples, the base station 105-a may enable OAM beamforming in a same slot in which the control signaling 210 is transmitted, which may be referred to as fast enabling. That is, in a slot (such as a slot 212), the base station 105-a may transmit control signaling 210 and a downlink transmission 230 using OAM beamforming. In such examples, the control signaling 210 may be an example of DCI with a k0 value of zero and may include one or more fields used to indicate the OAM configuration (e.g., one or more fields for configuring the slot 212 for OAM beamforming). The control signaling 210 may be included in a preamble 215 at the beginning of the slot 212, where the downlink transmissions 230 in the slot 212 are transmitted using OAM beamforming in accordance with the OAM configuration. In some examples, the control signaling 210 may be transmitted via one or more OAM beams associated with an OAM mode index of m=0, such that the UE 115-a may decode the control signaling 210 without having enabled OAM beamforming.

In some examples, whether the base station 105-a implements fast enabling may be dependent upon a capability of the UE 115-a to utilize digital beamforming. Digital beamforming may enable the UE 115-a to receive the indication that OAM beamforming is enabled and, in some cases, determine OAM configuration information, with sufficient latency to correctly receive and decode the downlink transmission 230 according to the OAM configuration. That is, in fast enabling, the UE 115-a may decode the control signaling 210, determine that OAM beamforming is enabled, and identify OAM configuration information before receiving and decoding the downlink transmission 230. Alternatively, in analog beamforming, the UE 115-a may receive and sample the control signaling 210 and the downlink transmission 230 in the same slot; due to the nature of analog beamforming, the UE 115-a may be unable to decode the OAM configuration information before receiving the downlink transmission 230.

As illustrated in FIG. 2, a slot 212 may include a preamble 215, a quantity of symbol periods and a quantity of cyclic prefixes (CPs) 220 associated with each symbol period, and downlink transmissions 230. In some examples, some symbol periods may be longer (in time duration measured from the start of the symbol period to the end of the symbol period) than other symbol periods, and such relatively longer symbol periods may include preambles 215 and/or CPs 220 that are longer (in time duration) than preambles 215 and CPs 220 of relatively shorter symbol periods. Such relatively longer CPs 220 may be referred to as extended CPs 220 and such relatively shorter CPs 220 may be referred to as normal CPs 220. Further, in some examples, a time duration of a preamble 515, a symbol period and a CP 220 of a symbol period may vary based on a numerology or subcarrier spacing (SCS). For instance, longer symbol periods and extended CPs 220 may span shorter durations in time at higher SCSs, but may still be relatively longer in time than other symbol periods and normal CPs.

According to the techniques described herein, the base station 105-a may transmit the indication that OAM beamforming is enabled and, in some cases, the OAM configuration, in a preamble 215 at the beginning of the slot 212, where the information included in the indication and the OAM configuration may be a based on a configuration of the slot 212. For example, a time duration of the preamble 215 may be based on the numerology or SCS of the slot 212, and the time duration of the preamble 215 may determine how much information may be transmitted in the preamble 215. In a first example, the preamble 215 may have a relatively short time duration (e.g., 0.5 microseconds). Based on the short time duration, the indication that OAM beamforming is enabled may be a binary indication (e.g., a single bit indicating that OAM beamforming is enabled or is not enabled) and the base station 105-a may refrain from transmitting OAM configuration information in the preamble 215.

In a second example, the preamble 215 may be associated with an increased sampling frequency and an increased bandwidth. Here, the base station 105-a may transmit the preamble 215 out-of-band of the downlink transmissions 230 due to the increased bandwidth. In this case, the preamble 215 may have a similarly short time duration as the first example, such that the base station 105-a only transmits an indication that OAM beamforming is enabled in the preamble 215 (e.g., and refrains from transmitting OAM configuration information in the preamble 215).

As a third example, the base station 105-a may split a first symbol of the slot 212 into two relatively shorter symbols and may transmit the preamble 215 in a first symbol of the two symbols and control information in a second symbol of the two symbols. In this example, the two symbols may be associated with an increased SCS, which may enable the base station 105-a to transmit the preamble 215 with an increased number of samples. In some examples, the base station 105-a may use the greater number of samples to convey a greater number of bits in the preamble 215. That is, the base station 105-a may utilize the increased number of bits to transmit OAM configuration information in the preamble 215. For instance, the base station 105-a may transmit an OAM mode index for each OAM beam, a beam index for each OAM beam, or the like. In some examples, if the base station 105-a is utilizing full duplex communications, the preamble 215 may include an indication of a radio network temporary identifier (RNTI) associated with the UE 115-a.

In a fourth example, the base station 105-a may transmit a first symbol of the slot 212 that includes the preamble 215 using a single carrier waveform (e.g., different from an OAM waveform). In this example, the UE 115-a may be capable of decoding the preamble 215 including the indication that OAM beamforming is enabled, as well as OAM configuration information, using a beamforming methodology other than OAM beamforming.

The UE 115-a may receive the control signaling 210 indicating that OAM beamforming is enabled and may receive the downlink transmission 230 via multiple OAM beams using OAM beamforming. If the UE 115-a receives an OAM configuration (e.g., as part of the control signaling 210), the UE 115-a may receive the downlink transmission 230 in accordance with the OAM configuration. For example, the UE 115-a may adjust one or more parameters associated with a butler matrix as described with reference to FIG. 5 based on one or more indicated OAM mode indexes.

In some examples, the base station 105-a may determine to disable OAM beamforming. For instance, the base station 105-a may determine that channel conditions have changed and that OAM beamforming may no longer provide reliable communications. In another example, the base station 105-a may determine and/or estimate a misalignment associated with the OAM communications and may disable OAM beamforming accordingly. In any case, the base station 105-a may transmit an indication to the UE 115-a that OAM beamforming is disabled, e.g., as part of additional control signaling (e.g., DCI, MAC-CE, RRC signaling, or the like). The base station 105-a and the UE 115-a may communicate thereafter using non-OAM beamforming.

Figure 3:
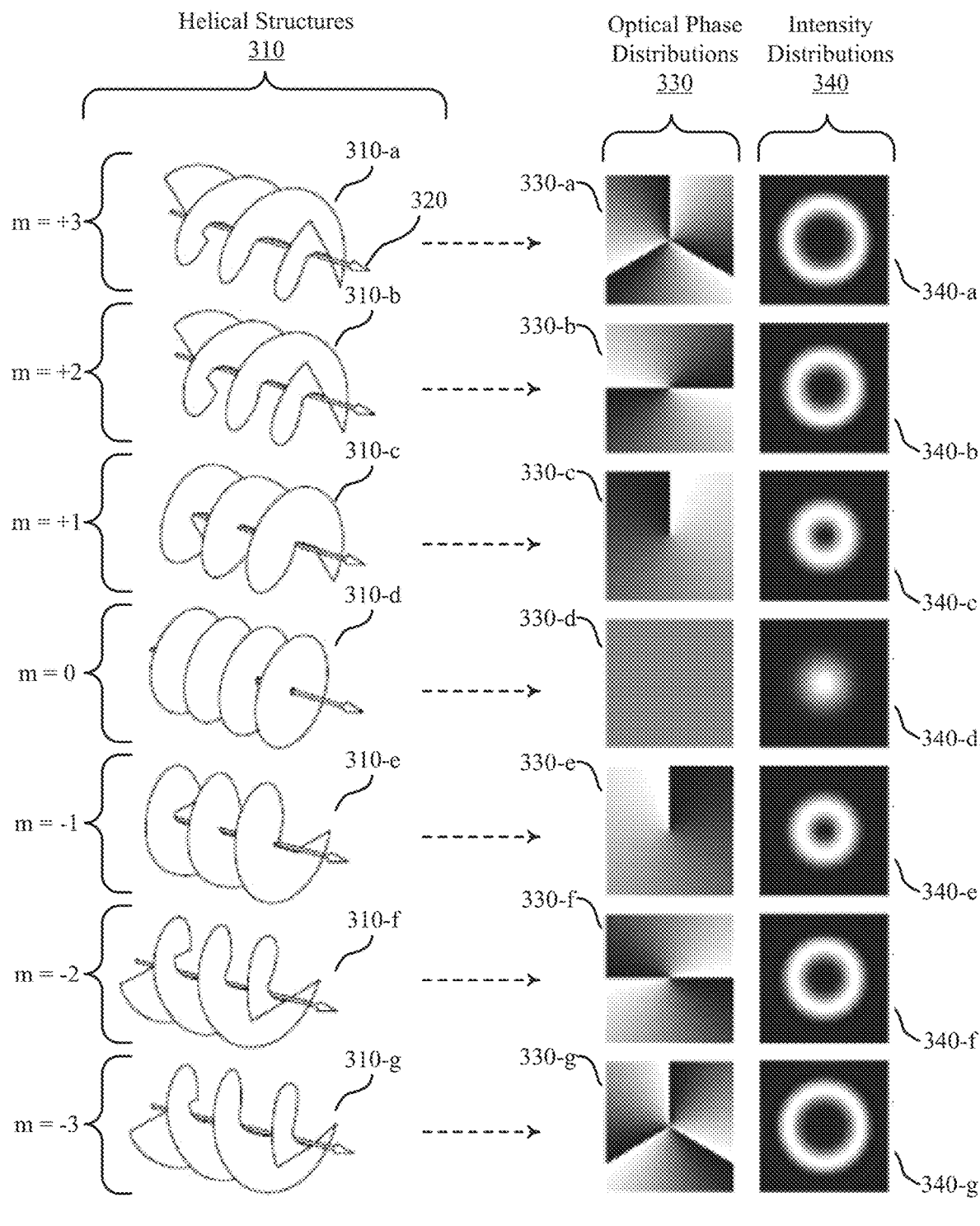
FIG. 3 illustrates an example of a helical structure diagram that supports OAM signaling in accordance with aspects of the present disclosure.

FIG. 3 illustrates an example of a helical structure diagram 300 that supports OAM signaling in accordance with aspects of the present disclosure. In some examples, helical structure diagram 300 may be implemented in or may implement aspects of wireless communications systems 100 or 200. For example, a device, such as a base station 105 or a UE 115 described with reference to FIGS. 1 and 2, may communicate using an OAM beam exemplified by the helical structure diagram 300, which includes various examples of OAM beams each associated with a helical structure 310, an optical phase distribution 330, and an intensity distribution 340.

An OAM beam may be an example of an electromagnetic wave that is emitted or transmitted to carry an OAM associated with a helical structure of a wavefront around an axis of a beam. As an example, the OAM of a beam may correspond to a component of angular momentum of the beam that is based on the field spatial distribution, e.g., rather than polarization. The field spatial distribution may be in the form of a helical or twisted wavefront shape, as illustrated by the helical structures 310. A helical structure 310 of a beam may be characterized by a wavefront that is shaped as a helix with a vortex (e.g., an optical vortex) in the center (e.g., at a beam axis 320). That is, each helical structure 310 may be associated with a different helical mode (which may also be referred to as an OAM mode, OAM state, or the like). The helical modes may be defined or referred to by a mode index m, where a sign of the mode index m corresponds to a "handedness" (e.g., left or right) of the helix (or helices) and a magnitude of the mode index m (e.g., |m| corresponds to a quantity of distinct but interleaved helices of the electromagnetic wave. Put another way, the sign of m may be positive or negative depending on the direction in which the helical structure 310 twists, while the magnitude of m may correspond to an integer number of times that the phase of the helical wavefront rotates around the beam axis 320. Additionally, the wavefront of a helical structure 310 may depend on m such that the wavefront includes |m| helical surfaces, each helical surface with a step length equal to a wavelength λ of the electromagnetic wave. In this manner, OAM beams may be differentiated between and characterized based on an associated OAM mode index m.

The mode index m may also be referred to as (e.g., may represent) a topological charge and corresponds to a number of rotations that a helical structure 310 exhibits in a path circling once around the center of a receiver, e.g., where the path has a length of 2n. The higher the value of the topological charge m, the faster the phase of the wavefront rotates around the beam axis 320. The spatial phase dependence factor of an OAM beam may be characterized by Equation 1 below.

$$\Phi(\theta)=e^{im\theta} \quad \text{Equation 1:}$$

In Equation 1, the parameter θ represents the angle measure (e.g., the azimuthal index) around the axis (e.g., the beam axis 320). The parameter mθ represents the phase difference acquired over the course of a cycle (e.g., 2π) for the topological charge m.

As illustrated in FIG. 3, each helical structure 310 depicts a shape of a helical structure of an OAM beam characterized by an OAM mode index (e.g., topological charge) m. A given helical structure 310 is associated with a corresponding optical phase distribution 330 and an intensity distribution 340, both shown from the perspective of a beam cross-section (e.g., with a center at a beam axis 320). In some examples, an intensity distribution 340 may be referred to as a vortex.

An electromagnetic wave associated with an OAM mode index of m=+1 is illustrated by the helical structure 310-c. Here, the electromagnetic wave may propagate in a right-handed pattern (e.g., has a right circular polarization or may be understood as having a clockwise circular polarization), based on the sign of m being positive. The magnitude of m (e.g., 1) indicates that the helical structure 310-c is characterized by one rotation of phase around the beam axis 320. An associated optical phase distribution 330-c indicates one cycle. That is, if a receiving element is placed perpendicular to the beam axis 320, the phase measured at the receiving element indicates that the helical structure 310-c is shaped as a single helical surface and completes one cycle (e.g., 0 to $2\pi$) of phase rotation around the beam axis 320.

The intensity distribution 340-c corresponding to the helical structure 310-c indicates a luminous intensity measured at the receiving element for the helical structure 310-c. Because of the twisting nature of the helical structure 310-c, the lights waves at the beam axis 320 cancel each other. When projected onto a flat surface (e.g., the receiving element placed perpendicular to the beam axis 320), the intensity distribution (i.e., optical vortex) appears as a ring of light with a dark vortex core in the center. The dark cortex core (also referred to as a "singularity") corresponds to a region of low intensity.

For an OAM mode index of m=−1, the electromagnetic wave shown by helical structure 310-e may propagate in a left-handed pattern (e.g., has a left circular polarization or may be understood as having a counter-clockwise circular polarization) as the sign of m is negative. The helical structure 310-e is also characterized by one rotation of phase around the beam axis 320, but is based on an opposite rotational direction from the helical structure 310-c. Despite opposite rotational directions, the helical structure 310-e has a corresponding optical phase distribution 330-e and intensity distribution 340-e that are similar to those of the helical structure 310-c.

An electromagnetic wave may be associated with an OAM mode index of m=0, illustrated by the helical structure 310-d, in which the helical structure 310-d has zero rotations around the beam axis 320. In this example, the electromagnetic wave is not helical and the wavefronts of the electromagnetic wave are multiple disconnected surfaces (e.g., the electromagnetic wave is a sequence of parallel—in this case, circular—planes). As there is no "twist" or phase rotation associated with the helical structure 310-d, the associated optical phase distribution 330-d indicates a same (e.g., constant) phase. Additionally, as there is no twist in the phase rotation associated with the helical structure 310-d, the corresponding intensity distribution 340-d does not depict a singularity at the center, since the light waves associated with the helical structure 310-d do not cancel each other out.

For further example, for an OAM mode index of m=2 or m=−2 as illustrated by helical structures 310-b and 310-f, respectively, the electromagnetic wave may propagate in either a right-handed pattern (if |m|>0, as in helical structure 310-b) or in a left-handed pattern (if |m|<0, as in helical structure 310-f) and the wavefront of the electromagnetic wave may include two distinct but interleaved helical surfaces. In such examples, the step length of each helical surface may be equal to $\lambda/2$. Likewise, the phase rotation over one revolution of the electromagnetic wave may be equal to $\pm 4\pi$. That is, the helical structures 310-b and 310-f are characterized by two rotations around the beam axis 320, as shown in the corresponding optical phase distributions 330-b and 330-f, respectively. Additionally, corresponding intensity distributions 340-b and 340-f are shown to be relatively larger (e.g., have a relatively larger radius) as compared to helical structures 310-c and 310-e; the additional "twists" associated with the helical structures 310-c and 310-e provide additional light beams close to the beam axis 320 and are associated with an increased (e.g., wider) low intensity region.

Generally, for m≥2, a mode-m electromagnetic wave may propagate in either a right-handed pattern or a left-handed pattern (depending on the sign of m) and may include m distinct but interleaved helical surfaces with a step length of each helical surface equal to $\lambda/|m|$. Likewise, the phase rotation over one revolution of the electromagnetic wave may be equal to $2m\pi$. Helical structures 310-a and 310-g are associated with OAM modes of m=3 and m=−3, respectively, and include three rotations around the beam axis 320 in opposite directions from one another. Corresponding optical phase distributions 330-a and 330-g indicate that the helical structures 310-a and 310-g are shaped as triple helical surfaces and complete three cycles (e.g., three completions of 0 to $2\pi$(or $6\pi$) of phase rotations around the beam axis 320.

Figure 4:
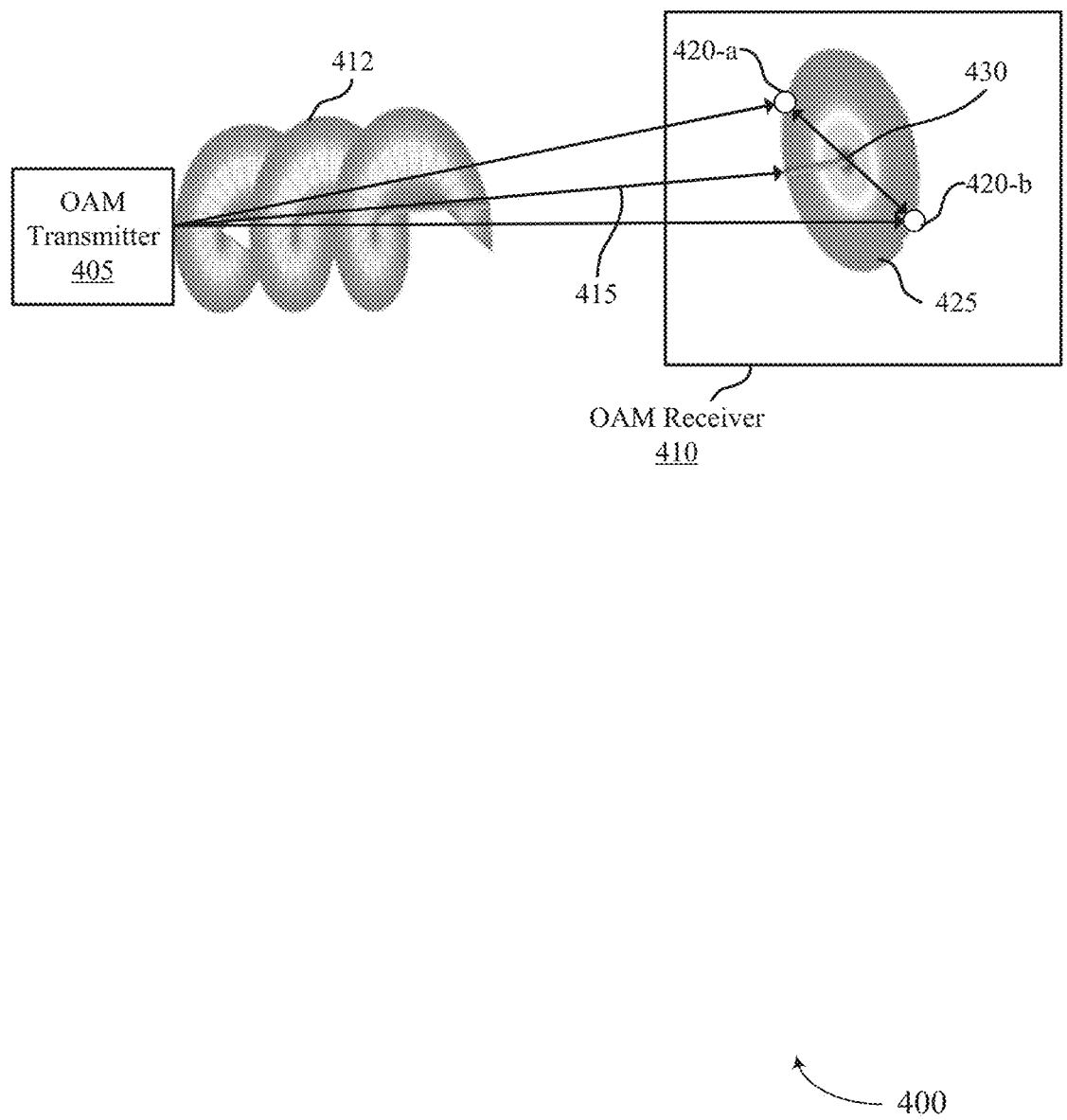
FIG. 4 illustrates an example of an OAM transmission scheme that supports OAM signaling in accordance with aspects of the present disclosure.

Additionally, corresponding intensity distributions 340-a and 340-g are shown to be relatively larger (e.g., have a relatively larger radius) than those associated with helical structures 310-b through 310-f. As illustrated in FIG. 4, the intensity distributions 340 show regions of higher energy (i.e., intensity). Thus, as the magnitude of m increases, the location of highest energy of an OAM beam extends further from the beam axis 320. OAM beams associated with different OAM modes may therefore be associated with different OAM patterns.

In some examples, an electromagnetic wave may be indefinitely extended to provide for an infinite number of degrees of freedom of the OAM of the electromagnetic wave (e.g., m=0, ±1, ±2, . . . , ±∞). As such, the OAM of the electromagnetic wave may be associated with infinite degrees of freedom.

In some examples, the OAM mode index m of an electromagnetic wave may correspond to or otherwise function as (e.g., be defined as) an additional dimension for signal or channel multiplexing. For example, each OAM mode, which may correspond to an OAM state (of which there may be infinite), may function similarly (e.g., or equivalently) to a communication channel, such as a sub-channel. In other words, an OAM mode or state may correspond to a communication channel, and vice versa. For instance, a base station and a UE may communicate via separate signals using electromagnetic waves having different OAM modes or states similarly to how a base station and a UE may transmit separate signals over different communication channels. In some aspects, such use of the OAM modes or states of an electromagnetic wave to carry different signals may be referred to as the use of OAM beams.

Additionally, in some examples, electromagnetic waves with different OAM modes (e.g., OAM states) may be mutually orthogonal to each other (e.g., in a Hilbert space, in which a space may include an infinite set of axes and sequences may become infinite by way of always having another coordinate direction in which next elements of the sequence can go). Likewise, in a Hilbert space, orthogonal OAM modes or states may correspond to orthogonal communication channels (e.g., orthogonal sequences transmitted over a communication channel) and, based on the potentially infinite number of OAM modes or states, the wireless communications system employing the use of OAM beams may theoretically achieve infinite capacity. For example, in theory, an infinite number of OAM states or modes may be twisted together for multiplexing and the capacity of the OAM link can approach infinity while preserving orthogonality between signals carried by different OAM modes (e.g., indices). In practice, however, due to non-ideal factors (e.g., Tx/Rx axial or position placement error, propagation divergence, and the like), crosstalk among OAM modes at a receiver may result, and thus a reduced number of concurrent OAM modes may be implemented between wireless devices (e.g., two or four concurrent OAM modes).

The helical structures 310, optical phase distributions 330, and intensity phase distributions 340 may be examples of characteristics of OAM beams used by wireless devices (e.g., base stations, UEs) to communicate via OAM beamforming according to the techniques described herein. For example, a base station may enable OAM beamforming for communications with a UE based on one or more communications parameters and a capability of the UE to use OAM beamforming. The base station may indicate, to the UE, that OAM beamforming is enabled; the indication may be included as part of control signaling, such as RRC signaling, a MAC-CE, DCI, or some combination thereof. In some examples, the control signaling may be transmitted via an OAM transmission associated with an OAM mode index of zero (m=0) as illustrated by helical structure 310-d, which may be received and decoded with or without OAM beamforming techniques. In this example, the UE may receive the indication that OAM beamforming is enabled at the base station even if the UE has not yet enabled OAM beamforming.

Additionally, the control signaling transmitted by the base station and received by the UE may include an indication of an OAM configuration (e.g., as part of DCI), which may include one or more parameters for the OAM communications. For example, once enabled, the base station may transmit a downlink transmission using OAM beamforming. The downlink transmission may include one or more OAM beams, each having an associated OAM mode index m and corresponding helical structure 310. In some cases, the base station may transmit the downlink transmission such that the one or more OAM beams are orthogonal to one another (e.g., have different OAM mode indexes m). The OAM configuration may indicate the OAM mode index m for each OAM beam of the downlink transmission. Additionally or alternatively, the OAM configuration may indicate an MCS for each respective OAM beam or a resource allocation for each respective OAM beam. The UE may receive the downlink transmission in accordance with the indicated OAM configuration.

FIG. 4 illustrates an example of an OAM transmission scheme 400 that supports OAM signaling in accordance with aspects of the present disclosure. In some examples, the OAM transmission scheme 400 may be implemented in or implement aspects of wireless communications systems 100 or 200. For example, the OAM transmission scheme 400 may be implemented by a device (e.g., a UE, a base station) in a wireless communications system 100 or 200 to generate a helical structure (e.g., such as a helical structure 310 described with reference to FIG. 3) for use in OAM communications. A helical structure may be generated using various techniques, and it is to be understood that FIG. 4 is a nonlimiting example. For instance, an OAM transmitter 405 may be an example of a UE and an OAM receiver 410 may be an example of a base station, or the OAM transmitter 405 may be an example of a base station and the OAM receiver 410 may be an example of a UE. Any other combination of wireless devices may be used. Additionally, in some examples, the OAM transmission scheme 400 may include one or more butler matrices (e.g., at the OAM transmitter 405, the OAM receiver 410, or both) as described in more detail with reference to FIG. 5.

In FIG. 4, an OAM transmission may be transmitted by an OAM transmitter 405 and received by an OAM receiver 410. The OAM transmitter 405 may include one or more antenna arrays composed of antenna elements. In some examples, the OAM transmitter 405 a component that is configured to generate a helical structure 412 with a particular OAM mode index (i.e., topological charge) m. In some examples, an optical element, such as a lens, may be employed to generate the helical structure 412. For example, a lens may be positioned and configured so that a beam output by the OAM transmitter 405 is associated with a particular OAM mode index (e.g., shaped with a particular topological charge), such as m=0, m=±1, etc. In other examples, a lens may not be used. In some examples, a helical structure 412 may be generated via a butler matrix described with reference to FIG. 5. While FIG. 4 illustrates an example of an OAM transmission associated with a single helical structure 412 (e.g., a single OAM beam), in some examples, an OAM transmitter 405 may transmit (and the OAM receiver 410 may receive) an OAM transmission using multiple OAM beams (e.g., each having a helical structure 412 around a beam axis 415) simultaneously, where each OAM beam is associated with a different OAM mode index.

An antenna array at the OAM receiver 410 may receive the OAM transmission output by the OAM transmitter 405. The OAM transmission may include the helical structure 412 centered along a beam axis 415, e.g., an axis of a beamformed signal. FIG. 4 depicts a vortex 425 that may correspond to an intensity distribution of the OAM transmission (e.g., associated with the helical structure 412, as described with reference to FIG. 3). The vortex 425 includes a singularity 430 associated with a low intensity (i.e., low energy) region.

The OAM transmission may be received at multiple antenna elements 420 at the OAM receiver 410, such as a first antenna element 420-a and a second antennal element 420-b. The OAM receiver 410 may compare the detected phases around the singularity 430 to determine the OAM mode index associated with the OAM transmission. For example, the OAM receiver 410 may measure the phase at the first antenna element 420-a and the phase at the second antenna element 420-b relative to the singularity 430 to determine the OAM mode index associated with the OAM transmission. In some examples, the number of antenna elements at which measurements are made may be based on the OAM mode index. For example, the receiver may use a number of antenna elements based on Equation 2 below.

$$\text{Number of elements} \geq 2|m|+1 \qquad \text{Equation 2:}$$

In Equation 2, the number of elements is determined as at least one more than twice the absolute value of the OAM mode index. For example, to detect an OAM mode index of m=+1 or m=−1, the OAM receiver 410 may employ at least three antenna elements to measure the phase. To detect an OAM mode index of m=−4 or m=3, the OAM receiver 410 may employ at least eight antenna elements to measure the phase. However, in some examples, the number of elements may depend on the configuration of the elements at the OAM receiver 410.

In some cases, to detect an OAM mode index, the OAM receiver 410 may compare phases using Equation 3 below.

$$\frac{1}{2\pi}\int d\theta e^{im\theta}e^{-im'\theta} = \delta_{m,m'}$$ Equation 3

In equation 3, the receiver 410 may compare the received phase pattern of the OAM transmission against possible phase patterns transmitted by the OAM transmitter 405 to determine the OAM mode index m associated with the OAM transmission. Put another way, equation 3 is the summation of the received spatial phase dependence factor (e.g., $e^{im\theta}$) and possible transmitted spatial phase dependence factors (e.g., $e^{-im'\theta}$). Two OAM beams with a same OAM mode index may sum to a value of $\delta_{m,m}$>0. Additionally, two orthogonal OAM beams may sum to a value of $\delta_{m,m}$=0.

The OAM transmitter 405 and the OAM receiver 410 may communicate using OAM beamforming according to the techniques described herein. For example, the OAM transmitter 405 and the OAM receiver 410 may enable OAM beamforming according to the techniques described herein. The OAM transmitter 405 may indicate, to the OAM receiver 410, that OAM beamforming is enabled; the indication may be included as part of control signaling, such as RRC signaling, a MAC-CE, DCI, or some combination thereof. In some examples, the control signaling may be transmitted via an OAM transmission associated with an OAM mode index of zero (m=0), such that the control signaling may be received and decoded without OAM beamforming, e.g., regardless of whether the OAM receiver 410 has enabled OAM beamforming. In some cases, the OAM receiver 410 may transmit, to the OAM transmitter 405, an indication of a request for OAM beamforming, such that the OAM transmitter transmits the OAM transmission of FIG. 4 based on the request.

Additionally, the OAM transmitter 405 and the OAM receiver 410 may transmit and receive, respectively, the OAM transmission according to an indicated OAM configuration. For instance, the OAM transmission may be associated with a single OAM beam or multiple OAM beams, and the OAM configuration may indicate a quantity of OAM beams, an MCS for each OAM beam, a resource allocation for each OAM beam, an OAM mode index m associated with each OAM beam, or the like.

In some examples, the OAM transmitter 405 and the OAM receiver 410 may be misaligned. That is, one or more antenna arrays of the OAM transmitter 405 (e.g., used to transmit the OAM transmission) and one or more antenna arrays of the OAM receiver 410 (e.g., used to receive the OAM transmission) may be misaligned along one or more axes. With any misalignment (for example, axial misalignment or rotational misalignment) between respective antenna arrays, OAM beams associated with different OAM index modes between the OAM transmitter 405 and the OAM receiver 410 may lose orthogonality, which may result in signal loss, among other disadvantages.

Misalignment in some scenarios may include a linear offset (for example, linear off-axis) in which the planar face of the respective antenna arrays are offset along the Z axis, as well as rotational offset(s) in which the planar face of the antenna arrays are rotated around the Z axis or the planar face of one antenna array is tilted or otherwise leans such that it is not parallel to the planar face of the other antenna array. Accordingly, various degrees of freedom may be present in the misalignment of the antenna arrays corresponding to the linear axis or the rotational offset(s) or both. In some scenarios, misalignment may be correctable, e.g., by the OAM transmitter 405, the OAM receiver 410, or both.

For instance, the OAM transmitter 405 may be an example of a base station. Before transmitting the OAM transmission illustrated in FIG. 4, the OAM transmitter 405 may determine (e.g., estimate) a misalignment associated with OAM beamforming between the OAM transmitter 405 and the OAM receiver 410. The OAM transmitter 405 may determine that the misalignment is correctable by the OAM transmitter 405 and may perform one or more procedures to correct the misalignment. The OAM transmitter 405 may estimate a remaining misalignment and may determine whether to enable OAM beamforming for the OAM transmission based on the remaining misalignment. For example, because misalignment may degrade performance of the OAM transmission, the OAM transmitter 405 may refrain from enabling OAM beamforming if the remaining misalignment is relatively large. As another example, the OAM transmitter 405 may estimate the misalignment after OAM beamforming is already enabled, may correct the misalignment, if possible, and estimate a remaining misalignment; in such examples, the OAM transmitter 405 may determine to continue using OAM beamforming or may determine to disable OAM beamforming based on the associated remaining misalignment.

Additionally, or alternatively, the OAM transmitter 405 may determine to refrain from enabling OAM beamforming, or may determine to disable OAM beamforming, based on a probability of misalignment to occur. For example, if the OAM receiver 410 is traveling at a relatively high speed, the likelihood of misalignment may be high, and the OAM transmitter 405 may be unable to correct the misalignment enough to reliably use OAM beamforming. Similarly, if the OAM receiver 410 is at a relatively large distance from the OAM transmitter 405, the OAM transmission may be less likely to be successfully received, for instance, based on an associated OAM mode index m. Here, as illustrated by the vortex 425, an energy distribution of an OAM beam may be dependent upon the associated OAM mode index m. As described with reference to FIG. 3, as the magnitude of an OAM mode index m increases, the radius of the low-intensity area (e.g., including the vortex 425) increases. Locations of higher energy of the OAM beam may be spread out further, e.g., based on the increased radius, which may correspond to a higher likelihood of misalignment or interference. In some examples, the OAM transmitter may improve reliability of an OAM beam with a relatively higher OAM index mode via a resource allocation of the OAM beam, for instance, by reducing a quantity of resources allocated to the OAM beam.

Figure 5:
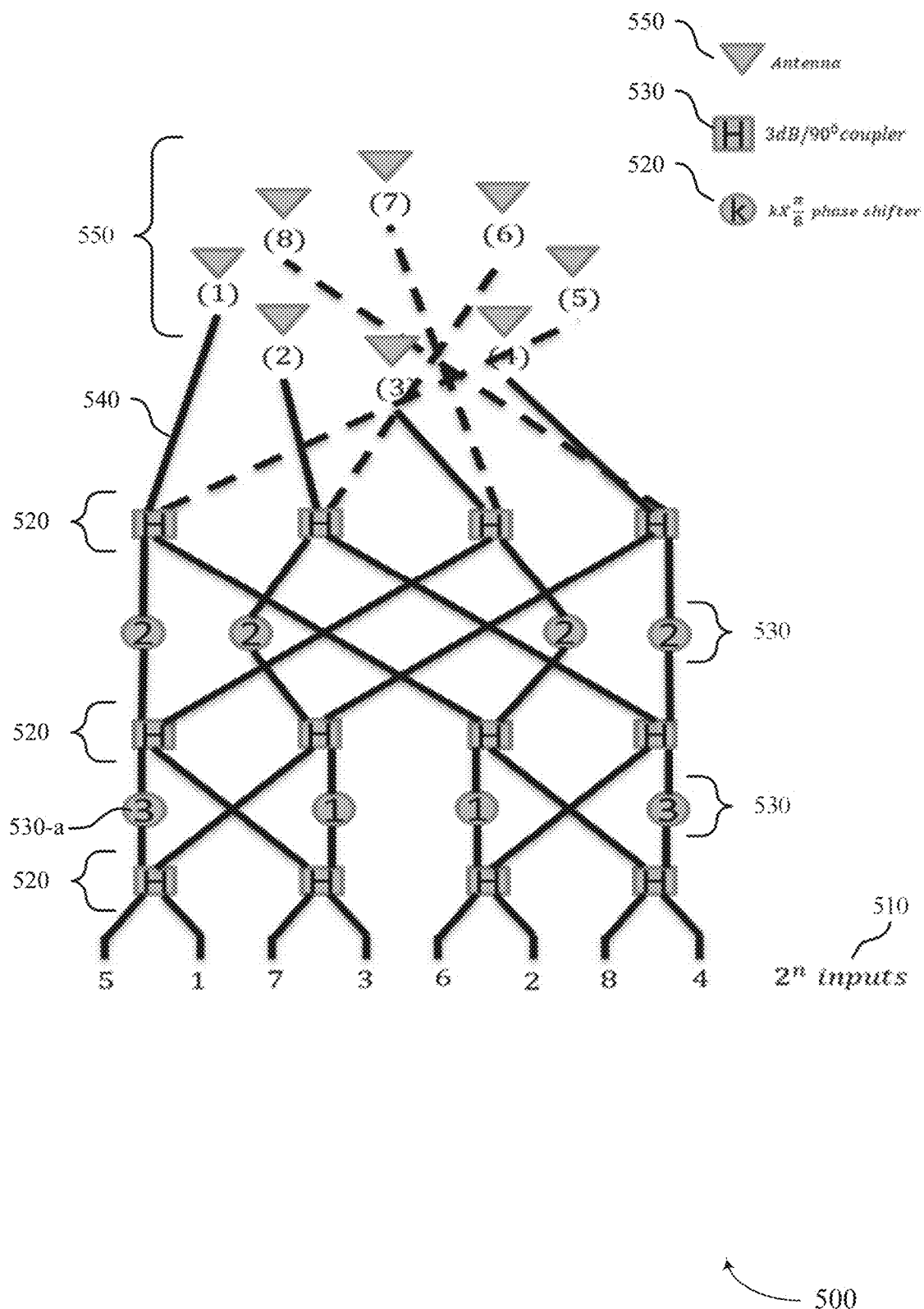
FIG. 5 illustrates an example of a butler matrix that supports OAM signaling in accordance with aspects of the present disclosure.

FIG. 5 illustrates an example of a butler matrix 500 that supports OAM signaling in accordance with aspects of the present disclosure. In some examples, the butler matrix 500 may be implemented in a wireless communications system 100 or 200. For instance, the butler matrix 500 may be an example of a beamforming matrix associated with an antenna array (e.g., a linear array) at a UE 115 or a base station 105 to support OAM beamforming. In some examples, a device may have multiple butler matrices 500, for instance, where a first butler matrix 500 is associated with a receiving antenna array and a second butler matrix is associated with a transmitting antenna array.

In general, a butler matrix may be an N by N matrix with multiple beam steering capabilities, and may be used for unified array antennas having N outputs connected to antenna elements and N inputs; the N inputs may represent or may be examples of N orthogonal beam ports (i.e., antenna ports). As illustrated, the butler matrix 500 includes eight inputs 510 that are passed through (e.g., along respective signal paths) a combination of twelve hybrid couplers 520 and eight fixed phase shifters 530 to generate eight outputs 540. A signal (e.g., a transmission) may be beamformed by being routed along one or more corresponding signal paths through associated hybrid couplers 520 and fixed phase shifters 530, such that an associated output 540 is a beamformed signal. At high frequencies (such as SHF, EHF, or mmW wave band and beyond, or any combination thereof), it is understood that signal paths of the butler matrix 500 (e.g., connecting hybrid couplers 520, fixed phase shifters 530, and outputs 540)—can include transmission lines or waveguides, or both.

The outputs 540 may be received by respective antenna elements 550 to generate eight example beams. Each of the respective hybrid couplers 520 may generate a 90 degree offset. Each of the respective fixed phase shifters 530 may create an integer multiplication of an index k of a $\pi/8$ phase shift. For example, an example fixed phase shifter 530-a creates an integer multiplication of an index k=3 of a $\pi/8$ phase shift (or a $3*\pi/8$ phase shift). As a result, the eight example beams generated by the butler matrix 500 are orthogonally spaced beams. The antenna elements 550 of the butler matrix may be arranged in a uniform circular array.

A device (e.g., a UE, a base station) may generate one or more OAM beams using OAM beamforming via a butler matrix 500 as described herein. For example, a device may include the antenna elements 550 in an antenna array, such as a circular array, connected to the butler matrix 500. The device may enable OAM beamforming according to the techniques described herein. The device may send the inputs 510 into the butler matrix 500 such that each input 510 is associated with a different OAM index; as illustrated, the inputs 510 may be associated with eight different OAM indexes. The outputs 540 and corresponding OAM beams may thus be orthogonal to one another. The device may transmit a downlink transmission using the OAM beams, for instance, in accordance with an OAM configuration. Likewise, a receiving device may utilize a butler matrix 500 to receive the OAM beams, for example, based on information received in an OAM configuration. In some cases, the receiving device may receive OAM configuration information in a preamble located in a first symbol of a slot and may receive an OAM-beamformed downlink transmission in the same slot. In such cases, the receiving device may utilize the butler matrix 500 based on information indicated in the preamble, e.g., as described with reference to FIG. 2.

Figure 6:
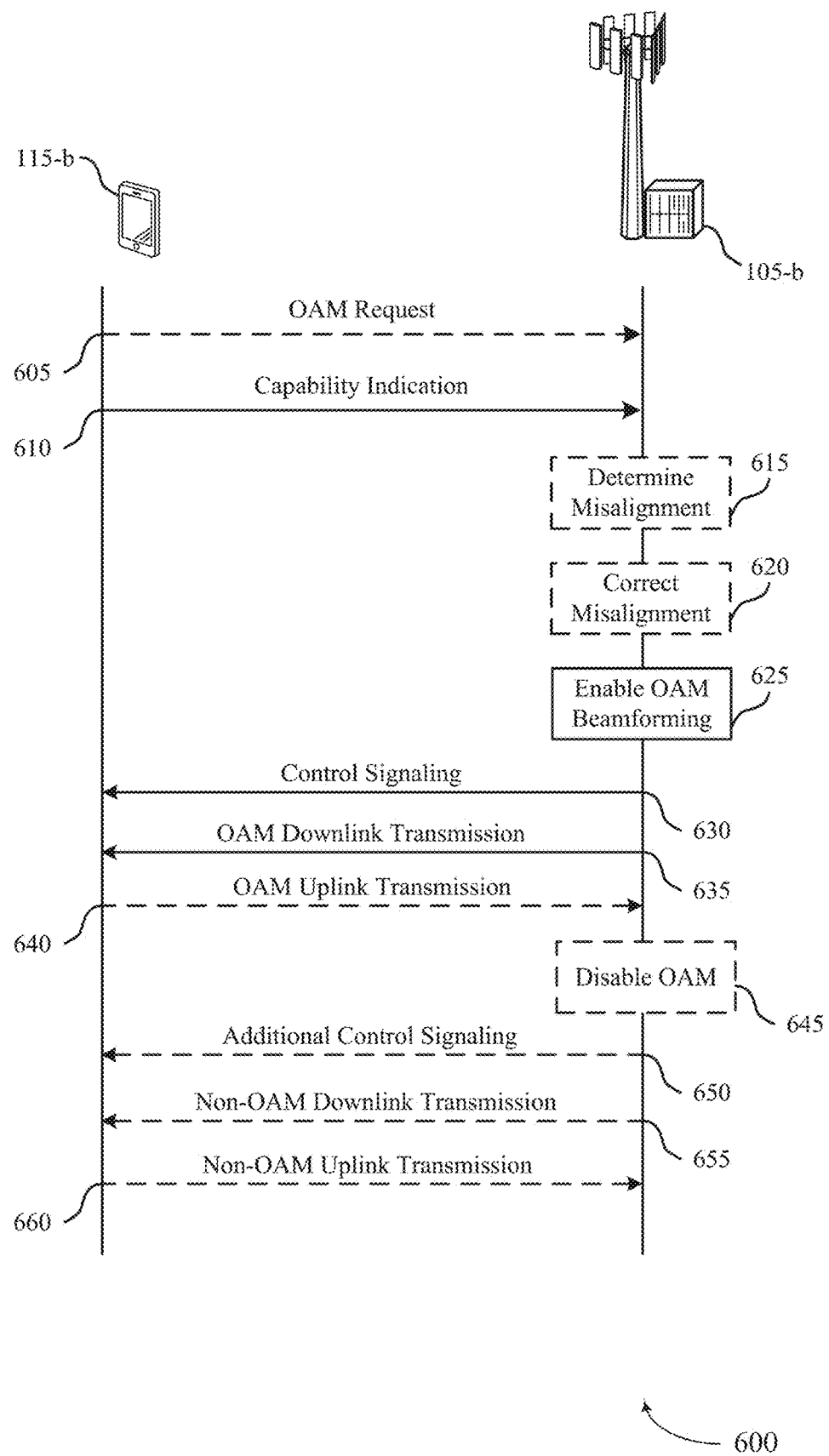
FIG. 6 illustrates an example of a process flow that supports OAM signaling in accordance with aspects of the present disclosure.

FIG. 6 illustrates an example of a process flow 600 that supports OAM signaling in accordance with aspects of the present disclosure. In some examples, process flow 600 may implement aspects of wireless communications system 100 or 200. For instance, the process flow 600 may illustrate OAM-based communication between a UE 115-b and a base station 105-b, which may be examples of corresponding devices described herein. Alternative examples of the following may be implemented, where some steps are performed in a different order than described or are not performed at all. In some cases, steps may include additional features not mentioned below, or further steps may be added.

Additionally, although the process flow 600 includes a base station 105-b and a UE 115-b, any wireless device may perform the operations shown.

At 605, the UE 115-b may optionally transmit, to the base station 105-b, a request message to enable OAM beamforming.

At 610, the UE 115-b may transmit, and the base station 105-b may receive, a message including an indication of a capability of the UE 115-b to use OAM beamforming. In some examples, at 610, the message may additionally include a capability of the UE 115-b to perform digital beamforming.

At 615, the base station 105-b may optionally determine a misalignment associated with the OAM beamforming and a corresponding channel. In some examples, the base station 105-b may determine the misalignment based on receiving, from the UE 115-b, a misalignment report, based on estimating the misalignment, or some combination thereof. The base station 105-b may determine that the misalignment is correctable by the base station 105-b.

At 620, the base station 105-b may optionally correct the misalignment determined at 615, for instance, based on determining that the misalignment is correctable. In some examples, the base station 105-b may determine a remaining misalignment after correcting the misalignment.

At 625, the base station 105-b may determine to enable OAM beamforming for communications with the UE 115-b based on the capability of the UE 115-b (e.g., as indicated at 610) and one or more communications parameters. In some cases, the one or more communications parameters may include one or more channel conditions, a channel rank, a speed of the UE 115-b, a distance between the base station 105-b and the UE 115-b, a throughput of the UE 115-b, or some combination thereof. Additionally, or alternatively, the base station 105-b may determine to enable OAM beamforming based on the misalignment determined at 615 and/or the remaining misalignment determined at 620.

At 630, the base station 105-b may transmit, and the UE 115-b may receive, control signaling including an indication that OAM beamforming is enabled. The control signaling may include RRC signaling, DCI, a MAC-CE, or some combination thereof. In some examples, the control signaling may be associated with an OAM index of zero.

In some examples, the control signaling communicated at 630 may include an OAM configuration, for instance, within a DCI. The OAM configuration (e.g., the DCI) may include (e.g., may indicate) an MCS for each beam of a set of beams, a resource allocation for each beam of the set of beams, a quantity of the set of beams, an OAM index for each beam of the set of beams, or some combination thereof. In some cases, the OAM configuration may be for a same slot in which the control signaling is transmitted such that the DCI includes one or more fields for configuring the same slot for OAM beamforming. In other cases, the OAM configuration may be for a subsequent slot, e.g., in accordance with one or more time offset values included in the control signaling; in such cases, a MAC-CE may include information for configuring the subsequent slot for OAM beamforming.

In some examples, the indication that OAM beamforming is enabled (i.e., the control signaling) may be transmitted in a preamble at a beginning of a slot. In such examples, the control signaling may further indicate an OAM index for each beam of the set of beams, an RNTI associated with the UE 115-b, or both.

At 635, the base station 105-b may transmit, and the UE 115-b may receive, a downlink transmission using the set of beams via OAM beamforming. In some examples, if the indication that OAM beamforming is enabled is transmitted in a preamble at a beginning of a slot, the downlink transmission may be transmitted in the same slot. In other examples, the downlink transmission may be transmitted in a slot subsequent to the control signaling transmitted at 630.

At 640, the UE 115-*b* may optionally transmit, and the base station 105-*b* may receive, an uplink transmission using OAM beamforming. In some examples, the downlink transmission communicated at 635 and the uplink transmission communicated at 640 may be based on (e.g., in accordance with) the OAM configuration transmitted at 630.

At 645, the base station 105-*b* may determine to disable OAM beamforming for communications with the UE 115-*b*.

At 650, based on determining to disable OAM beamforming at 645, the base station 105-*b* may transmit, and the UE 115-*b* may receive, additional control signaling indicating that OAM beamforming is disabled. In some examples, the additional control signaling may include or may be an example of RRC signaling, a MAC-CE, DCI, or other examples.

At 655, the base station 105-*b* may transmit, and the UE 115-*b* may receive, a downlink transmission using non-OAM beamforming.

At 660, the UE 115-*b* may transmit, and the base station 105-*b* may receive, an uplink transmission using non-OAM beamforming.

Figure 7:
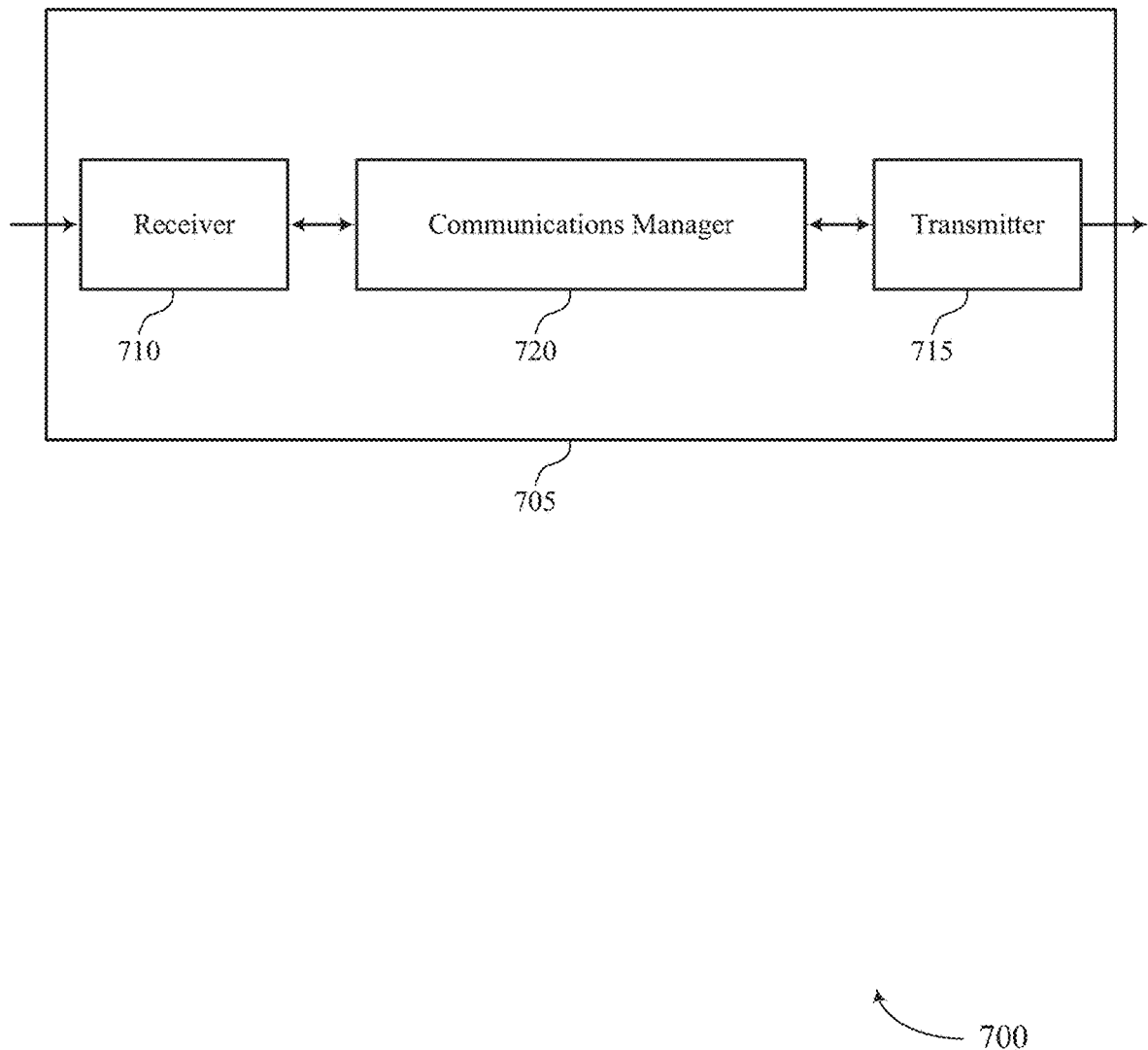
FIGS. 7 and 8 show block diagrams of devices that support OAM signaling in accordance with aspects of the present disclosure.

FIG. 7 shows a block diagram 700 of a device 705 that supports orbital angular momentum signaling in accordance with aspects of the present disclosure. The device 705 may be an example of aspects of a base station 105 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to orbital angular momentum signaling). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to orbital angular momentum signaling). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of orbital angular momentum signaling as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a base station in accordance with examples as disclosed herein. For example, the communications manager 720 may be configured as or otherwise support a means for receiving, from a UE, a message indicating a UE capability to use OAM beamforming. The communications manager 720 may be configured as or otherwise support a means for determining, based on the UE capability and one or more communications parameters, to enable OAM beamforming for communications with the UE. The communications manager 720 may be configured as or otherwise support a means for transmitting, to the UE, control signaling including an indication that OAM beamforming is enabled. The communications manager 720 may be configured as or otherwise support a means for transmitting a downlink transmission to the UE using a set of multiple beams via OAM beamforming.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for dynamically enabling and disabling OAM beamforming, which may support more efficient utilization of communication resources. For example, the device 705 may increase throughput and improve the likelihood of decoding success by using OAM communications. Such techniques may increase communication efficiency, which may also reduce power consumption and increase battery life at the device 705.

Figure 8:
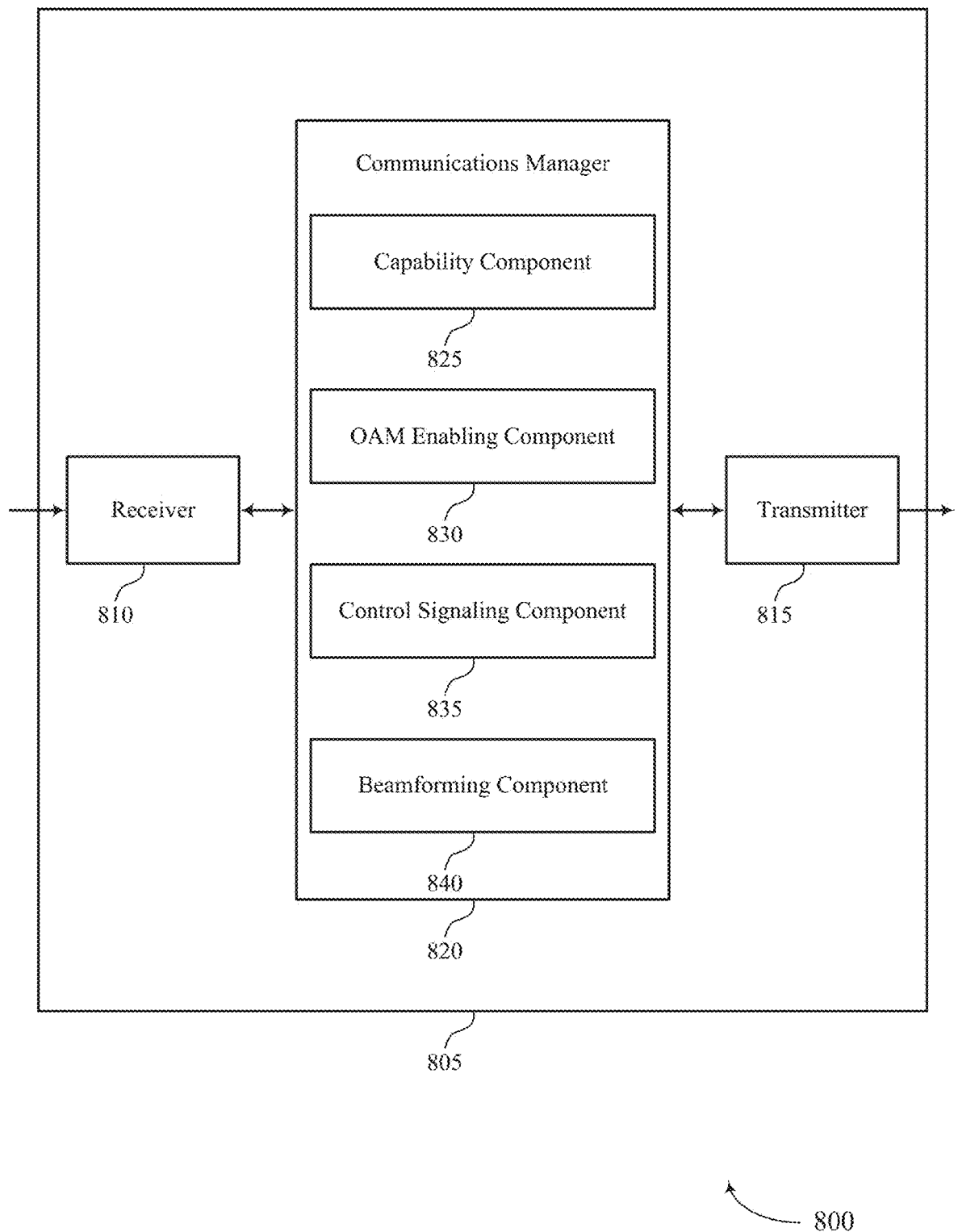

FIG. 8 shows a block diagram 800 of a device 805 that supports OAM signaling in accordance with aspects of the present disclosure. The device 805 may be an example of aspects of a device 705 or a base station 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to OAM signaling). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to OAM signaling). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of OAM signaling as described herein. For example, the communications manager 820 may include a capability component 825, a OAM enabling component 830, a control signaling component 835, a beamforming component 840, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a base station in accordance with examples as disclosed herein. The capability component 825 may be configured as or otherwise support a means for receiving, from a UE, a message indicating a UE capability to use OAM beamforming. The OAM enabling component 830 may be configured as or otherwise support a means for determining, based on the UE capability and one or more communications parameters, to enable OAM beamforming for communications with the UE. The control signaling component 835 may be configured as or otherwise support a means for transmitting, to the UE, control signaling including an indication that OAM beamforming is enabled. The beamforming component 840 may be configured as or otherwise support a means for transmitting a downlink transmission to the UE using a set of multiple beams via OAM beamforming.

Figure 9:
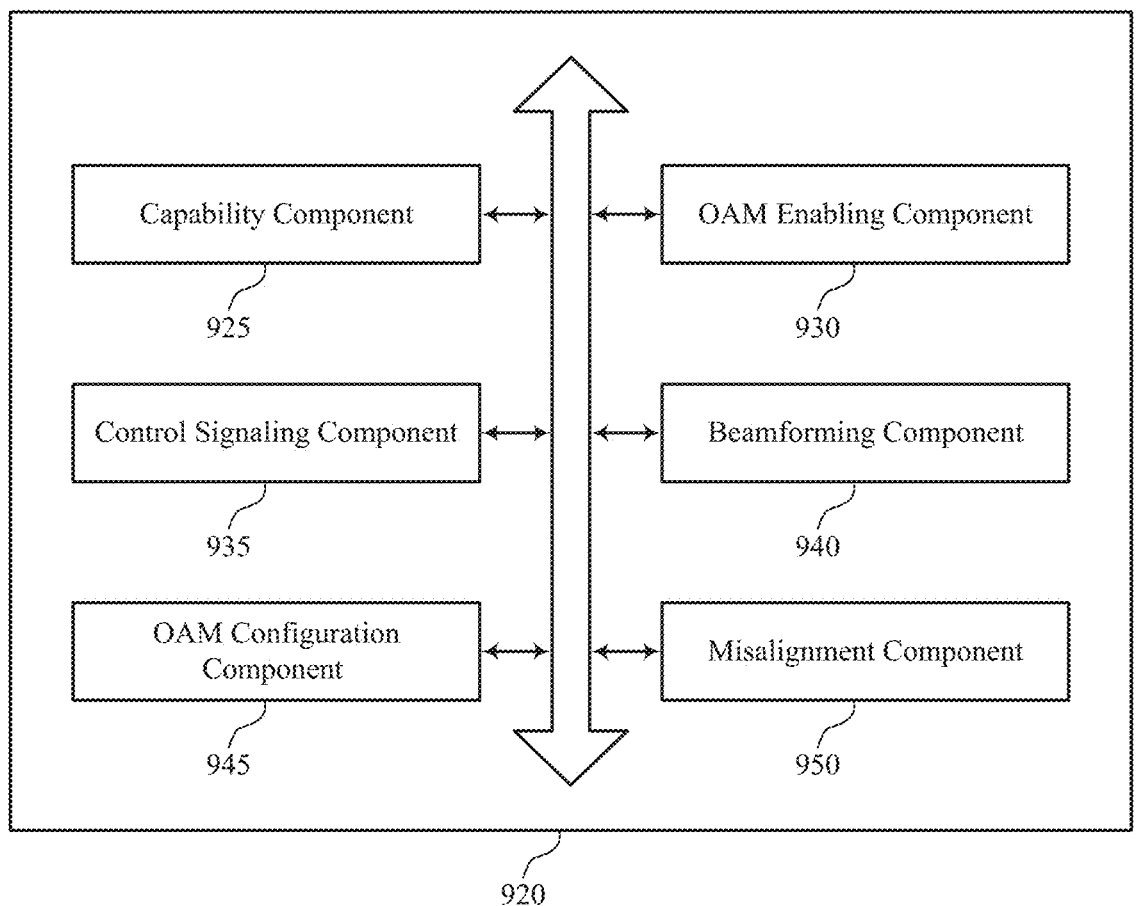
FIG. 9 shows a block diagram of a communications manager that supports OAM signaling in accordance with aspects of the present disclosure.

FIG. 9 shows a block diagram 900 of a communications manager 920 that supports OAM signaling in accordance with aspects of the present disclosure. The communications manager 920 may be an example of aspects of a communications manager 720, a communications manager 820, or both, as described herein. The communications manager 920, or various components thereof, may be an example of means for performing various aspects of OAM signaling as described herein. For example, the communications manager 920 may include a capability component 925, a OAM enabling component 930, a control signaling component 935, a beamforming component 940, a OAM configuration component 945, a misalignment component 950, or any combination thereof. Each of these components may communicate, directly or indirectly, with one another (e.g., via one or more buses).

The communications manager 920 may support wireless communications at a base station in accordance with examples as disclosed herein. The capability component 925 may be configured as or otherwise support a means for receiving, from a UE, a message indicating a UE capability to use OAM beamforming. The OAM enabling component 930 may be configured as or otherwise support a means for determining, based on the UE capability and one or more communications parameters, to enable OAM beamforming for communications with the UE. The control signaling component 935 may be configured as or otherwise support a means for transmitting, to the UE, control signaling including an indication that OAM beamforming is enabled. The beamforming component 940 may be configured as or otherwise support a means for transmitting a downlink transmission to the UE using a set of multiple beams via OAM beamforming.

In some examples, the message further indicates an additional UE capability to perform digital beamforming.

In some examples, the OAM configuration component 945 may be configured as or otherwise support a means for transmitting an OAM configuration within a DCI message as part of the control signaling. In some examples, the OAM configuration indicates a modulation and coding scheme for each beam of the set of multiple beams, a resource allocation for each beam of the set of multiple beams, a quantity of the set of multiple beams, an OAM index for each beam of the set of multiple beams, or a combination thereof. In some examples, the OAM configuration is for either a same slot in which the control signaling is transmitted or a subsequent slot, in accordance with one or more time offset values included in the control signaling.

In some examples, the DCI message includes fields for configuring the same slot for OAM beamforming.

In some examples, a MAC-CE includes information for configuring the subsequent slot for OAM beamforming.

In some examples, to support transmitting the control signaling, the control signaling component 935 may be configured as or otherwise support a means for transmitting the indication in a preamble at a beginning of a slot that includes the downlink transmission.

In some examples, to support transmitting the control signaling, the control signaling component 935 may be configured as or otherwise support a means for transmitting the control signaling which is indicative of an OAM index for each beam of the set of multiple beams, an RNTI associated with the UE, or both. In some examples, the communications parameters include one or more channel conditions, a channel rank, a misalignment associated with the OAM beamforming, a speed of the UE, a distance between the base station and the UE, a throughput of the UE, or a combination thereof.

In some examples, the misalignment component 950 may be configured as or otherwise support a means for determining the misalignment associated with the channel based on receiving a misalignment report from the UE, estimating the misalignment, or a combination thereof.

In some examples, the misalignment component 950 may be configured as or otherwise support a means for determining that a misalignment associated with the OAM beamforming is correctable by the base station. In some examples, the misalignment component 950 may be configured as or otherwise support a means for correcting the misalignment based on the determining. In some examples, the misalignment component 950 may be configured as or otherwise support a means for estimating a remaining misalignment associated with the OAM beamforming, where determining to enable OAM beamforming is based on the remaining misalignment.

In some examples, the OAM enabling component 930 may be configured as or otherwise support a means for receiving, from the UE, a request message to enable OAM beamforming, where determining to enable OAM beamforming is based on receiving the request message.

In some examples, the control signaling includes RRC signaling, a MAC-CE, DCI, or a combination thereof. In some examples, the control signaling is associated with an OAM index of zero.

In some examples, the OAM enabling component 930 may be configured as or otherwise support a means for determining to disable OAM beamforming for communications with the UE. In some examples, the control signaling component 935 may be configured as or otherwise support a means for transmitting, to the UE, additional control signaling that indicates that OAM beamforming is disabled. In some examples, the beamforming component 940 may be configured as or otherwise support a means for communicating with the UE using non-OAM beamforming.

Figure 10:
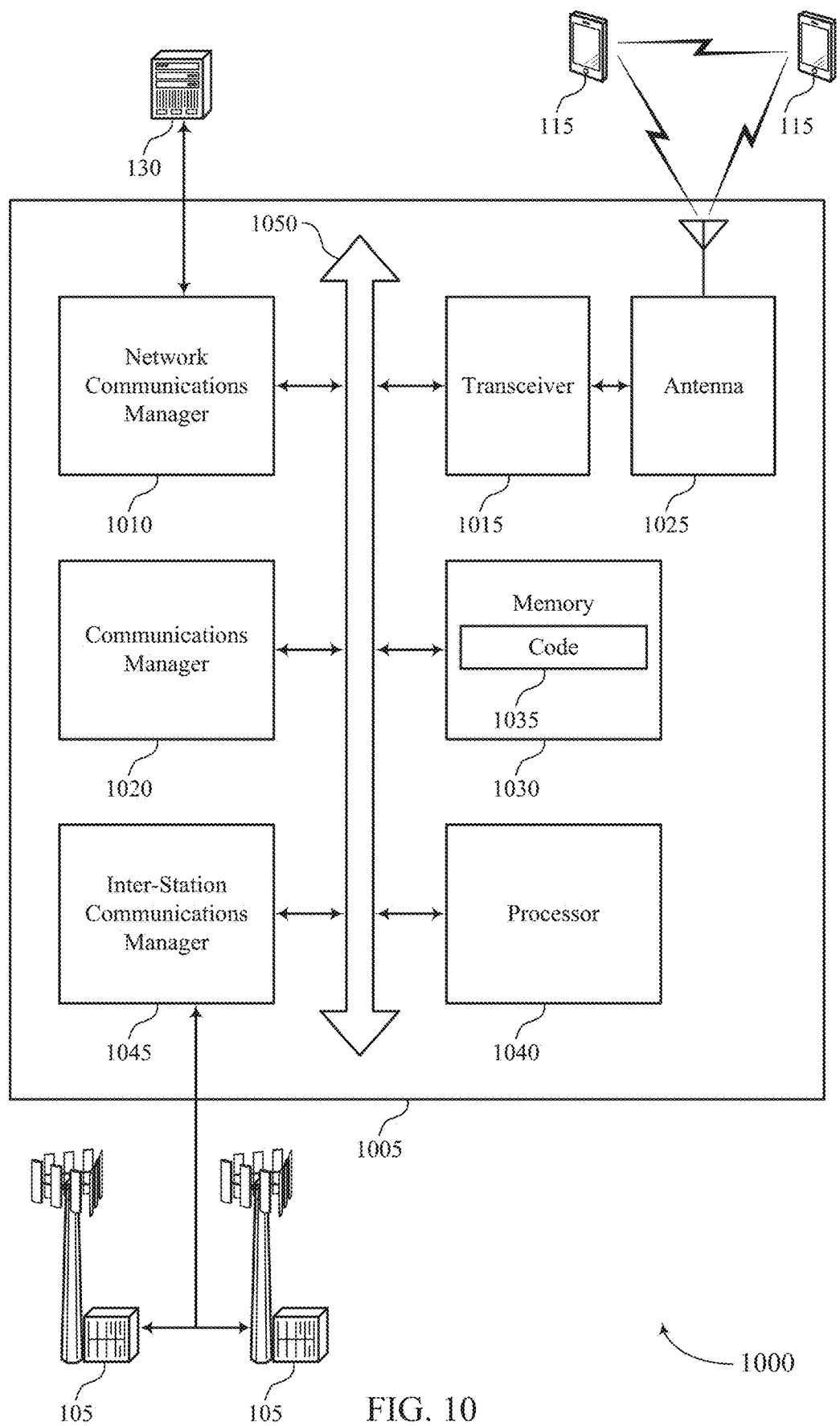
FIG. 10 shows a diagram of a system including a device that supports OAM signaling in accordance with aspects of the present disclosure.

FIG. 10 shows a diagram of a system 1000 including a device 1005 that supports OAM signaling in accordance with aspects of the present disclosure. The device 1005 may be an example of or include the components of a device 705, a device 805, or a base station 105 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, a network communications manager 1010, a transceiver 1015, an antenna 1025, a memory 1030, code 1035, a processor 1040, and an inter-station communications manager 1045. These components may be in electronic communication or otherwise coupled (e.g., operatively, communicatively, functionally, electronically, electrically) via one or more buses (e.g., a bus 1050).

The network communications manager 1010 may manage communications with a core network 130 (e.g., via one or more wired backhaul links). For example, the network communications manager 1010 may manage the transfer of data communications for client devices, such as one or more UEs 115.

In some cases, the device 1005 may include a single antenna 1025. However, in some other cases the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include RAM and ROM. The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a BIOS which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting OAM signaling). For example, the device 1005 or a component of the device 1005 may include a processor 1040 and memory 1030 coupled to the processor 1040, the processor 1040 and memory 1030 configured to perform various functions described herein.

The inter-station communications manager 1045 may manage communications with other base stations 105, and may include a controller or scheduler for controlling communications with UEs 115 in cooperation with other base stations 105. For example, the inter-station communications manager 1045 may coordinate scheduling for transmissions to UEs 115 for various interference mitigation techniques such as beamforming or joint transmission. In some examples, the inter-station communications manager 1045 may provide an X2 interface within an LTE/LTE-A wireless communications network technology to provide communication between base stations 105.

The communications manager 1020 may support wireless communications at a base station in accordance with examples as disclosed herein. For example, the communications manager 1020 may be configured as or otherwise support a means for receiving, from a UE, a message indicating a UE capability to use OAM beamforming. The communications manager 1020 may be configured as or otherwise support a means for determining, based on the UE capability and one or more communications parameters, to enable OAM beamforming for communications with the UE. The communications manager 1020 may be configured as or otherwise support a means for transmitting, to the UE, control signaling including an indication that OAM beamforming is enabled. The communications manager 1020 may be configured as or otherwise support a means for transmitting a downlink transmission to the UE using a set of multiple beams via OAM beamforming.

By including or configuring the communications manager 1020 in accordance with examples as described herein, the device 1005 may support techniques for dynamically enabling and disabling OAM beamforming, which may support more efficient utilization of communication resources. For example, the device 1005 may increase throughput and improve the likelihood of decoding success by using OAM communications. Such techniques may further improve communications reliability, which may in turn reduce system latency.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of OAM signaling as described herein, or the processor 1040 and the memory 1030 may be otherwise configured to perform or support such operations.

Figure 11:
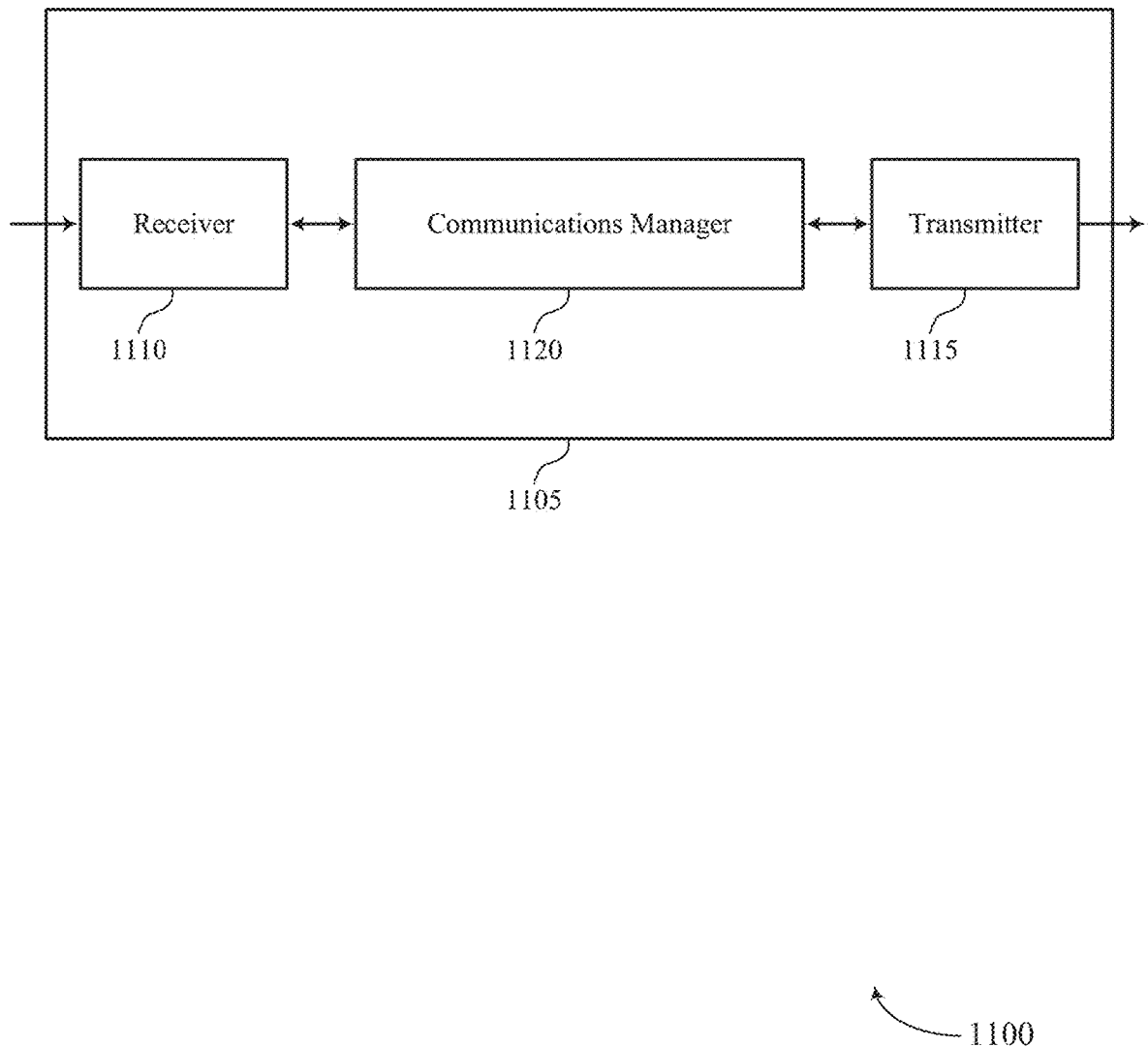
FIGS. 11 and 12 show block diagrams of devices that support OAM signaling in accordance with aspects of the present disclosure.

FIG. 11 shows a block diagram 1100 of a device 1105 that supports OAM signaling in accordance with aspects of the present disclosure. The device 1105 may be an example of aspects of a UE 115 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to OAM signaling). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to OAM signaling). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of OAM signaling as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a UE in accordance with examples as disclosed herein. For example, the communications manager 1120 may be configured as or otherwise support a means for transmitting, to a base station, a message indicating a UE capability of the UE to use OAM beamforming. The communications manager 1120 may be configured as or otherwise support a means for receiving, from the base station, control signaling including an indication that OAM beamforming is enabled. The communications manager 1120 may be configured as or otherwise support a means for receiving a downlink transmission from the base station using a set of multiple beams via OAM beamforming.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for dynamically enabling and disabling OAM beamforming, which may support more efficient utilization of communication resources. For example, by using OAM beamforming, the device 1105 may increase communications throughput and reliability. Such techniques may increase communication efficiency, which may also reduce power consumption and increase battery life at the device 1105.

Figure 12:
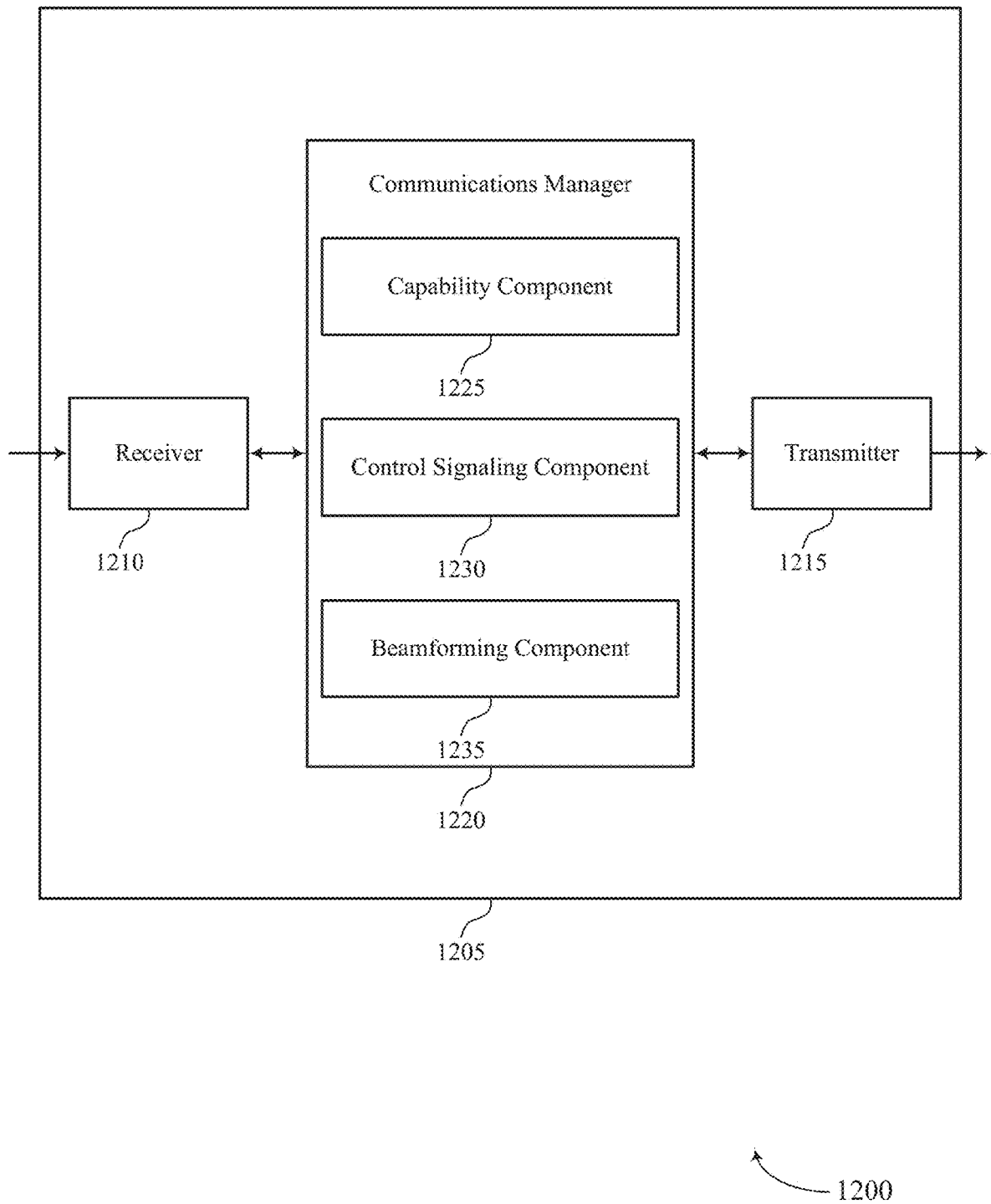

FIG. 12 shows a block diagram 1200 of a device 1205 that supports OAM signaling in accordance with aspects of the present disclosure. The device 1205 may be an example of aspects of a device 1105 or a UE 115 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to OAM signaling). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to OAM signaling). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of OAM signaling as described herein. For example, the communications manager 1220 may include a capability component 1225, a control signaling component 1230, a beamforming component 1235, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communications at a UE in accordance with examples as disclosed herein. The capability component 1225 may be configured as or otherwise support a means for transmitting, to a base station, a message indicating a UE capability of the UE to use OAM beamforming. The control signaling component 1230 may be configured as or otherwise support a means for receiving, from the base station, control signaling including an indication that OAM beamforming is enabled. The beamforming component 1235 may be configured as or otherwise support a means for receiving a downlink transmission from the base station using a set of multiple beams via OAM beamforming.

Figure 13:
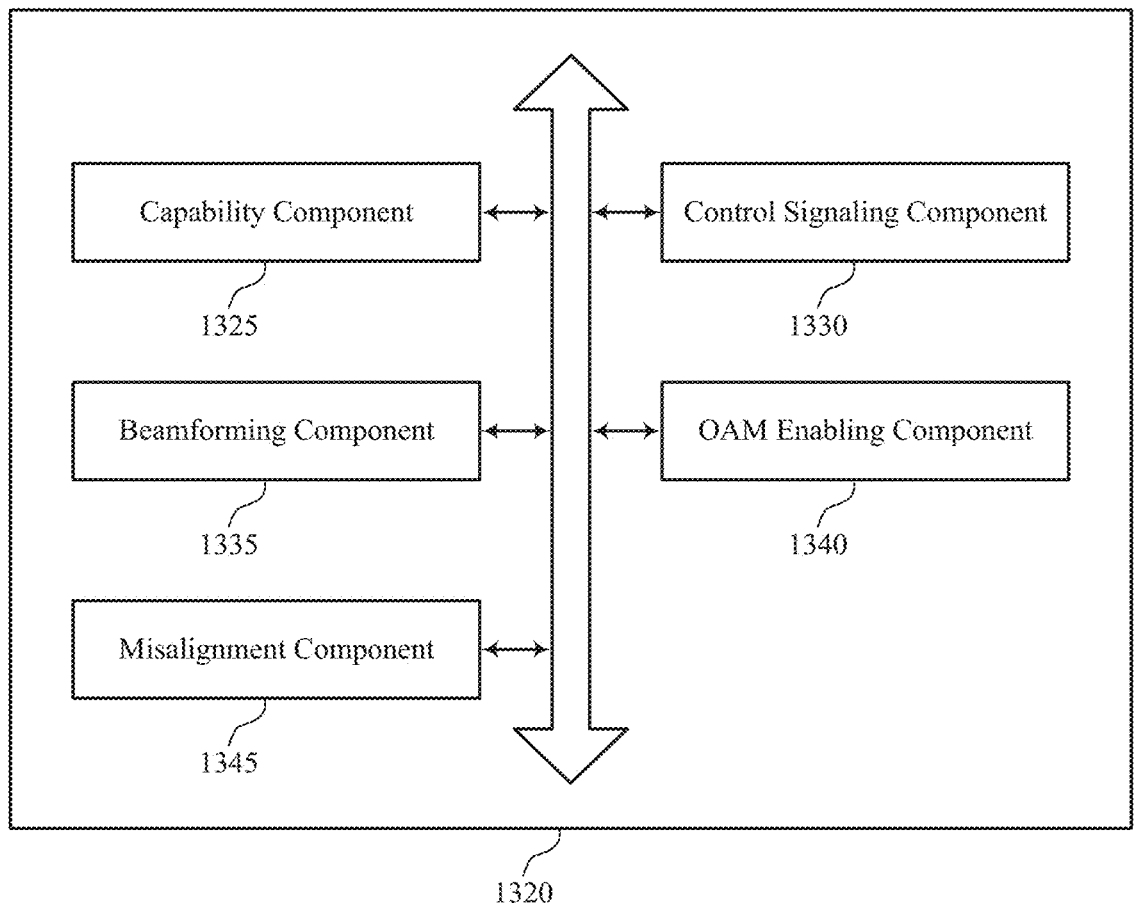
FIG. 13 shows a block diagram of a communications manager that supports OAM signaling in accordance with aspects of the present disclosure.

FIG. 13 shows a block diagram 1300 of a communications manager 1320 that supports OAM signaling in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of OAM signaling as described herein. For example, the communications manager 1320 may include a capability component 1325, a control signaling component 1330, a beamforming component 1335, a OAM enabling component 1340, a misalignment component 1345, or any combination thereof. Each of these components may communicate, directly or indirectly, with one another (e.g., via one or more buses).

The communications manager 1320 may support wireless communications at a UE in accordance with examples as disclosed herein. The capability component 1325 may be configured as or otherwise support a means for transmitting, to a base station, a message indicating a UE capability of the UE to use OAM beamforming. The control signaling component 1330 may be configured as or otherwise support a means for receiving, from the base station, control signaling including an indication that OAM beamforming is enabled. The beamforming component 1335 may be configured as or otherwise support a means for receiving a downlink transmission from the base station using a set of multiple beams via OAM beamforming.

In some examples, the control signaling component 1330 may be configured as or otherwise support a means for receiving an OAM configuration within a DCI message as part of the control signaling. In some examples, the OAM configuration indicates a modulation and coding scheme for each beam of the set of multiple beams, a resource allocation for each beam of the set of multiple beams, a quantity of the set of multiple beams, an OAM index for each beam of the set of multiple beams, or a combination thereof. In some examples, the OAM configuration is for either a same slot in which the control signaling is transmitted or a subsequent slot, in accordance with one or more time offset values included in the control signaling.

In some examples, the DCI message includes fields for configuring the same slot for OAM beamforming.

In some examples, a MAC-CE includes information for configuring the subsequent slot for OAM beamforming.

In some examples, to support receiving the control signaling, the control signaling component 1330 may be configured as or otherwise support a means for receiving the indication in a preamble at a beginning of a slot that includes the downlink transmission. In some examples, to support receiving the control signaling, the control signaling component 1330 may be configured as or otherwise support a means for receiving the control signaling which is indicative of an OAM index for each beam of the set of multiple beams, a RNTI associated with the UE, or both.

In some examples, the communications parameters include one or more channel conditions, a channel rank, a misalignment associated with the OAM beamforming, a speed of the UE, a distance between the base station and the UE, a throughput of the UE, or a combination thereof.

In some examples, the misalignment component 1345 may be configured as or otherwise support a means for transmitting, to the base station, a misalignment report.

In some examples, the OAM enabling component 1340 may be configured as or otherwise support a means for transmitting, to the base station, a request message to enable OAM beamforming.

In some examples, the control signaling includes RRC signaling, a MAC-CE, DCI, or a combination thereof. In some examples, the control signaling is associated with an OAM index of zero.

In some examples, the OAM enabling component 1340 may be configured as or otherwise support a means for receiving, from the base station, additional control signaling that indicates that OAM beamforming is disabled. In some examples, the beamforming component 1335 may be configured as or otherwise support a means for communicating with the base station using non-OAM beamforming.

In some examples, the message further indicates an additional UE capability to perform digital beamforming.

Figure 14:
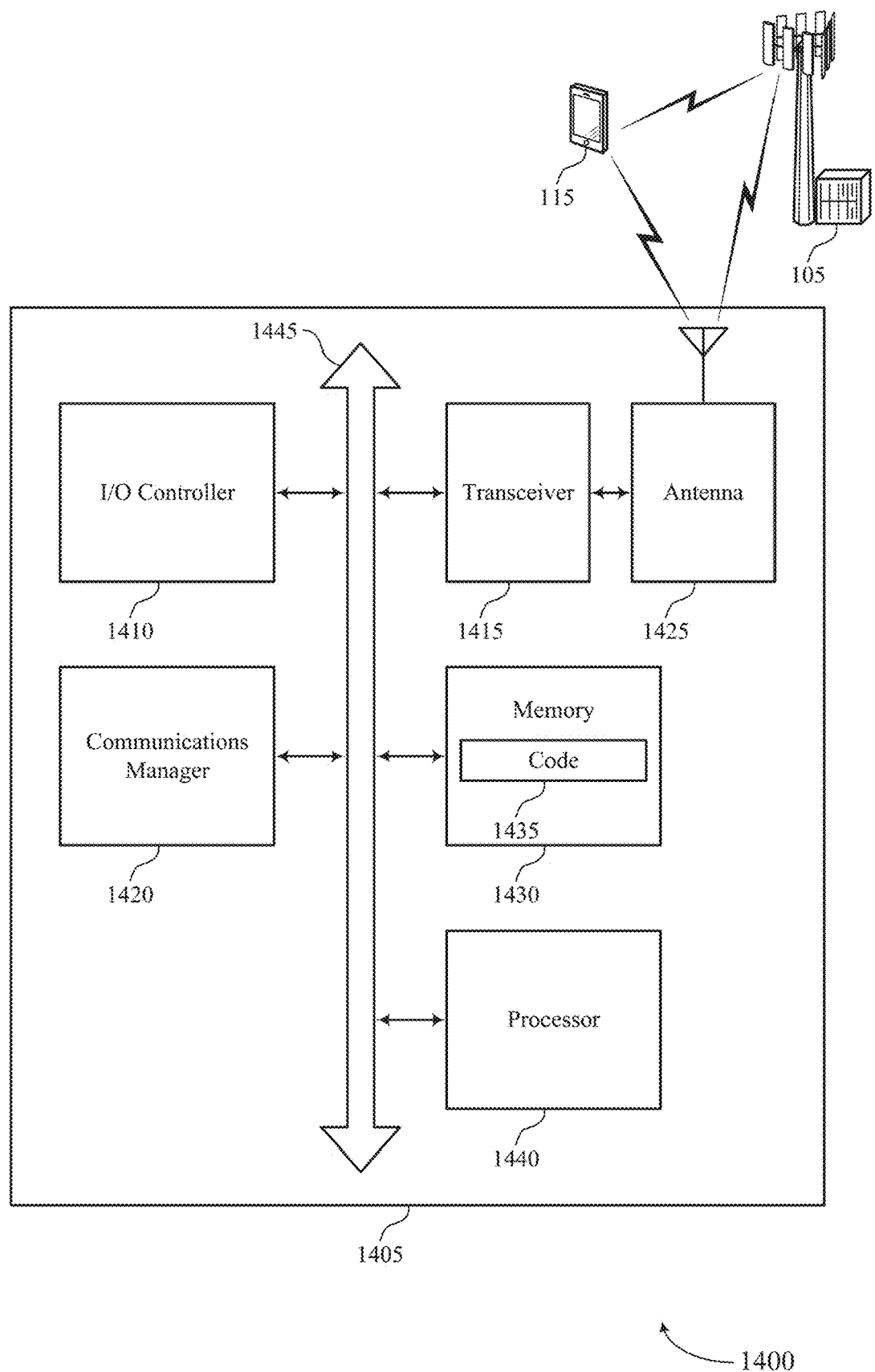
FIG. 14 shows a diagram of a system including a device that supports OAM signaling in accordance with aspects of the present disclosure.

FIG. 14 shows a diagram of a system 1400 including a device 1405 that supports OAM signaling in accordance with aspects of the present disclosure. The device 1405 may be an example of or include the components of a device 1105, a device 1205, or a UE 115 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, an input/output (I/O) controller 1410, a transceiver 1415, an antenna 1425, a memory 1430, code 1435, and a processor 1440. These components may be in electronic communication or otherwise coupled (e.g., operatively, communicatively, functionally, electronically, electrically) via one or more buses (e.g., a bus 1445).

The I/O controller 1410 may manage input and output signals for the device 1405. The I/O controller 1410 may also manage peripherals not integrated into the device 1405. In some cases, the I/O controller 1410 may represent a physical connection or port to an external peripheral. In some cases, the I/O controller 1410 may utilize an operating system such as iOS®, ANDROID®, MS-DOS®, MS-WINDOWS®, OS/2®, UNIX®, LINUX®, or another known operating system. Additionally or alternatively, the I/O controller 1410 may represent or interact with a modem, a keyboard, a mouse, a touchscreen, or a similar device. In some cases, the I/O controller 1410 may be implemented as part of a processor, such as the processor 1440. In some cases, a user may interact with the device 1405 via the I/O controller 1410 or via hardware components controlled by the I/O controller 1410.

In some cases, the device 1405 may include a single antenna 1425. However, in some other cases, the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include random access memory (RAM) and read-only memory (ROM). The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a basic I/O system (BIOS) which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting OAM signaling). For example, the device 1405 or a component of the device 1405 may include a processor 1440 and memory 1430 coupled to the processor 1440, the processor 1440 and memory 1430 configured to perform various functions described herein.

The communications manager 1420 may support wireless communications at a UE in accordance with examples as disclosed herein. For example, the communications manager 1420 may be configured as or otherwise support a means for transmitting, to a base station, a message indicating a UE capability of the UE to use OAM beamforming. The communications manager 1420 may be configured as or otherwise support a means for receiving, from the base station, control signaling including an indication that OAM beamforming is enabled. The communications manager 1420 may be configured as or otherwise support a means for receiving a downlink transmission from the base station using a set of multiple beams via OAM beamforming.

By including or configuring the communications manager 1420 in accordance with examples as described herein, the device 1405 may support techniques for dynamically enabling and disabling OAM beamforming, which may support more efficient utilization of communication resources. For example, OAM beamforming may generally be associated with increased throughput and reliability in some scenarios. The device 1405 may therefore reduce overall system latency and improve the likelihood of decoding success by using OAM communications.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of OAM signaling as described herein, or the processor 1440 and the memory 1430 may be otherwise configured to perform or support such operations.

Figure 15:
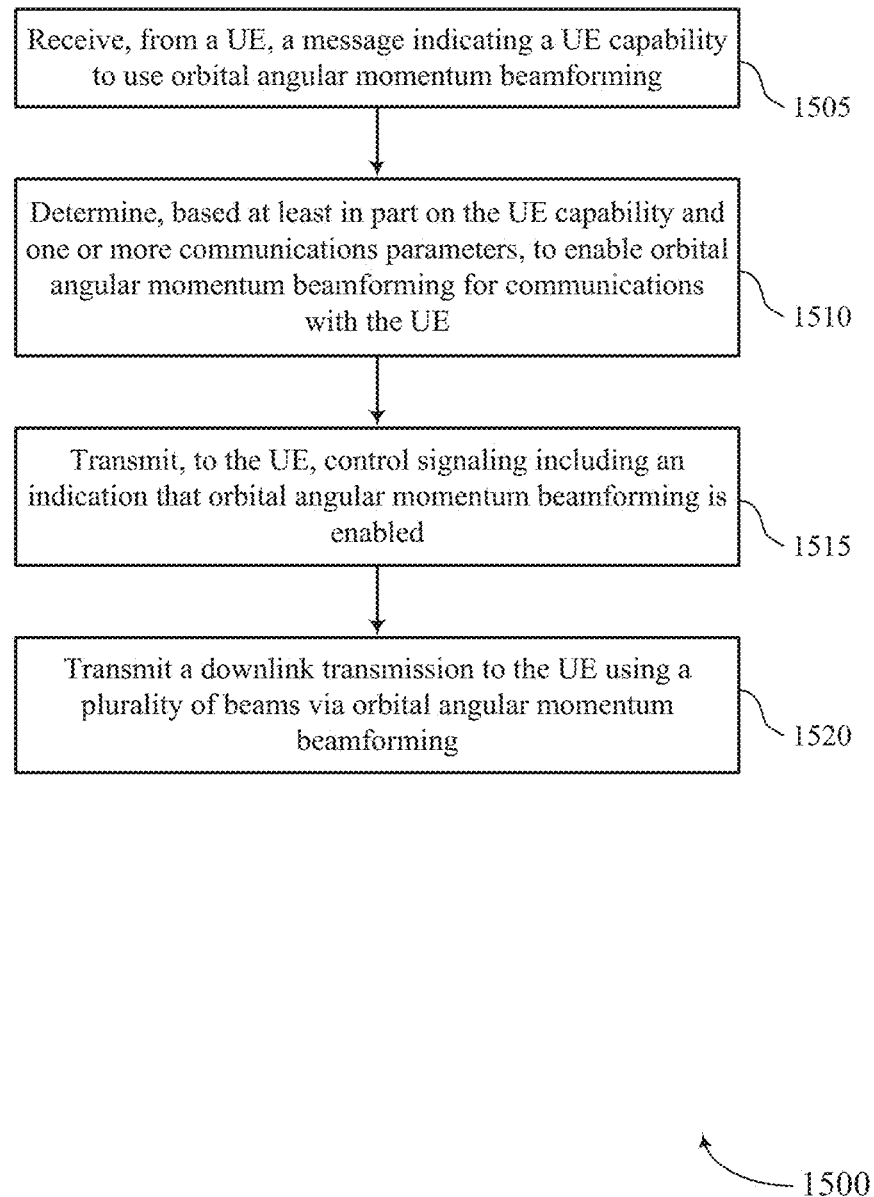
FIGS. 15 through 18 show flowcharts illustrating methods that support OAM signaling in accordance with aspects of the present disclosure.

FIG. 15 shows a flowchart illustrating a method 1500 that supports OAM signaling in accordance with aspects of the present disclosure. The operations of the method 1500 may be implemented by a base station or its components as described herein. For example, the operations of the method 1500 may be performed by a base station 105 as described with reference to FIGS. 7 through 10. In some examples, a base station may execute a set of instructions to control the functional elements of the base station to perform the described functions. Additionally or alternatively, the base station may perform aspects of the described functions using special-purpose hardware.

At 1505, the method may include receiving, from a UE, a message indicating a UE capability to use OAM beamforming. The operations of 1505 may be performed in accordance with examples as disclosed herein. In some examples, aspects of the operations of 1505 may be performed by a capability component 925 as described with reference to FIG. 9.

At 1510, the method may include determining, based on the UE capability and one or more communications parameters, to enable OAM beamforming for communications with the UE. The operations of 1510 may be performed in accordance with examples as disclosed herein. In some examples, aspects of the operations of 1510 may be performed by a OAM enabling component 930 as described with reference to FIG. 9.

At 1515, the method may include transmitting, to the UE, control signaling including an indication that OAM beamforming is enabled. The operations of 1515 may be performed in accordance with examples as disclosed herein. In some examples, aspects of the operations of 1515 may be performed by a control signaling component 935 as described with reference to FIG. 9.

At 1520, the method may include transmitting a downlink transmission to the UE using a set of multiple beams via OAM beamforming. The operations of 1520 may be performed in accordance with examples as disclosed herein. In some examples, aspects of the operations of 1520 may be performed by a beamforming component 940 as described with reference to FIG. 9.

Figure 16:
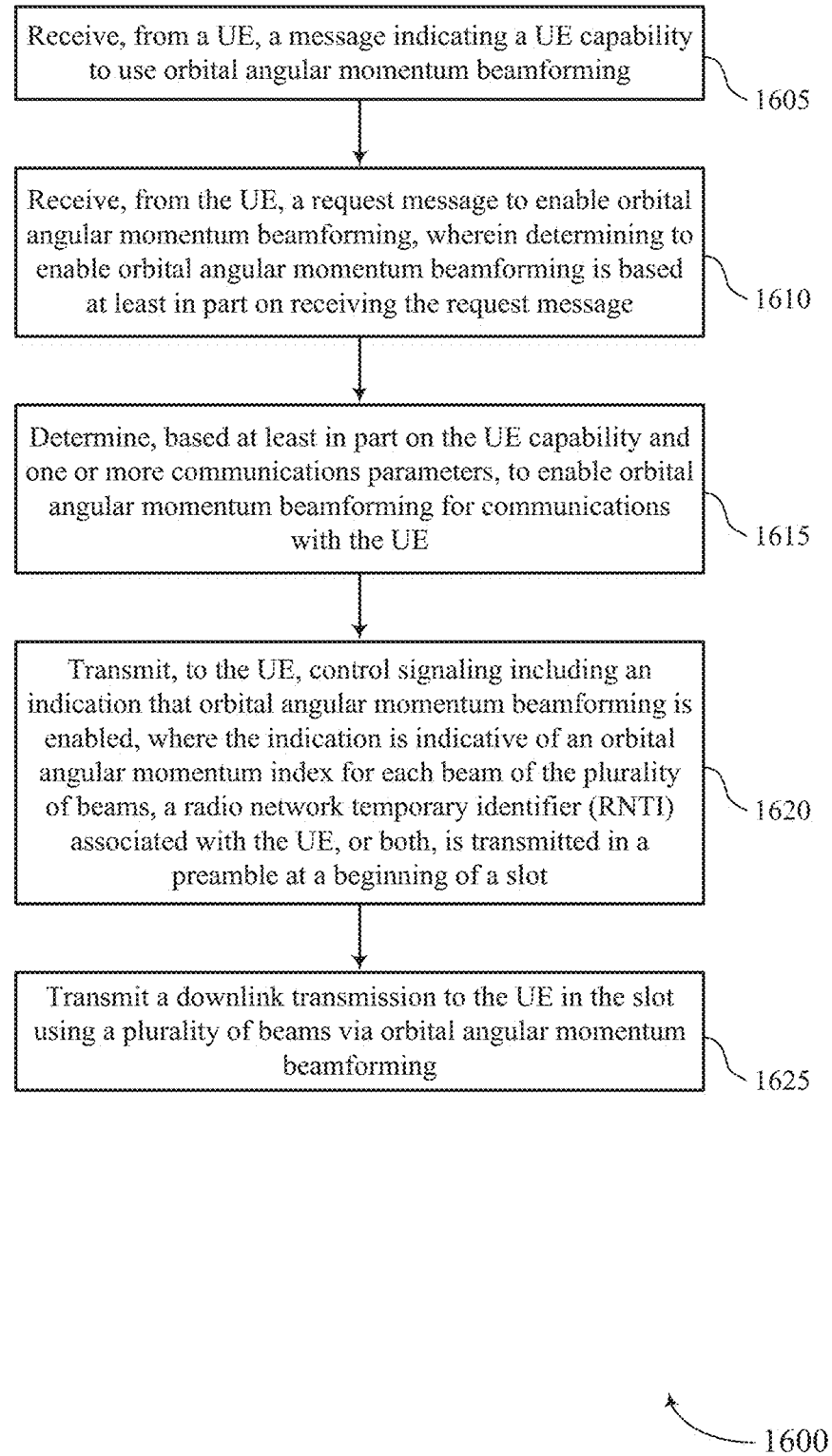

FIG. 16 shows a flowchart illustrating a method 1600 that supports OAM signaling in accordance with aspects of the present disclosure. The operations of the method 1600 may be implemented by a base station or its components as described herein. For example, the operations of the method 1600 may be performed by a base station 105 as described with reference to FIGS. 71 through 10. In some examples, a base station may execute a set of instructions to control the functional elements of the base station to perform the described functions. Additionally or alternatively, the base station may perform aspects of the described functions using special-purpose hardware.

At 1605, the method may include receiving, from a UE, a message indicating a UE capability to use OAM beamforming. The operations of 1605 may be performed in accordance with examples as disclosed herein. In some examples, aspects of the operations of 1605 may be performed by a capability component 925 as described with reference to FIG. 9.

At 1610, the method may include receiving, from the UE, a request message to enable OAM beamforming, where determining to enable OAM beamforming is based on receiving the request message. The operations of 1610 may be performed in accordance with examples as disclosed herein. In some examples, aspects of the operations of 1610 may be performed by a OAM enabling component 930 as described with reference to FIG. 9.

At 1615, the method may include determining, based on the UE capability and one or more communications parameters, to enable OAM beamforming for communications with the UE. The operations of 1615 may be performed in accordance with examples as disclosed herein. In some examples, aspects of the operations of 1615 may be performed by a OAM enabling component 930 as described with reference to FIG. 9.

At 1620, the method may include transmitting, to the UE, control signaling including an indication that OAM beamforming is enabled, where the indication is indicative of an OAM index for each beam of the plurality of beams, an RNTI associated with the UE, or both, is transmitted in a preamble at a beginning of a slot. The operations of 1620 may be performed in accordance with examples as disclosed herein. In some examples, aspects of the operations of 1620 may be performed by a control signaling component 935 as described with reference to FIG. 9.

At 1625, the method may include transmitting a downlink transmission to the UE in the slot using a set of multiple beams via OAM beamforming. The operations of 1625 may be performed in accordance with examples as disclosed herein. In some examples, aspects of the operations of 1625 may be performed by a beamforming component 940 as described with reference to FIG. 9.

Figure 17:
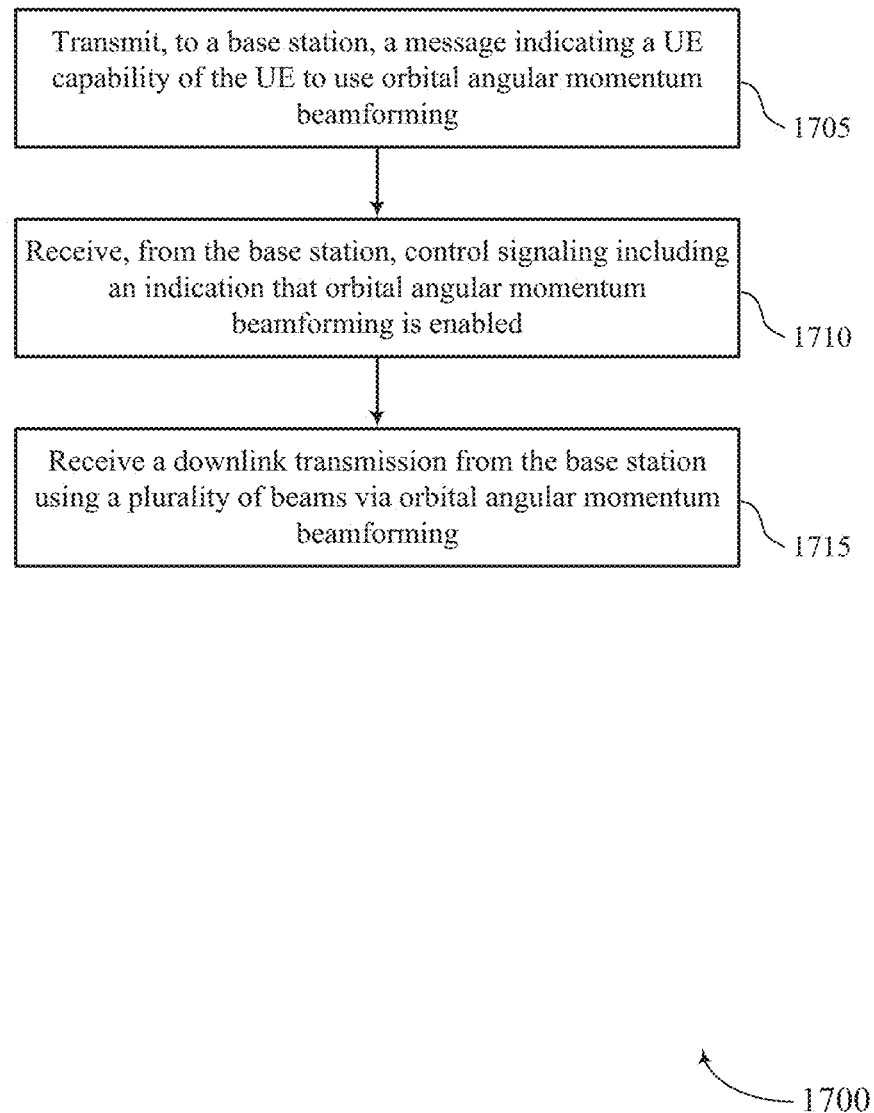

FIG. 17 shows a flowchart illustrating a method 1700 that supports OAM signaling in accordance with aspects of the present disclosure. The operations of the method 1700 may be implemented by a UE or its components as described herein. For example, the operations of the method 1700 may be performed by a UE 115 as described with reference to FIGS. 11 through 14. In some examples, a UE may execute a set of instructions to control the functional elements of the UE to perform the described functions. Additionally or alternatively, the UE may perform aspects of the described functions using special-purpose hardware.

At 1705, the method may include transmitting, to a base station, a message indicating a UE capability of the UE to use OAM beamforming. The operations of 1705 may be performed in accordance with examples as disclosed herein. In some examples, aspects of the operations of 1705 may be performed by a capability component 1325 as described with reference to FIG. 13.

At 1710, the method may include receiving, from the base station, control signaling including an indication that OAM beamforming is enabled. The operations of 1710 may be performed in accordance with examples as disclosed herein. In some examples, aspects of the operations of 1710 may be performed by a control signaling component 1330 as described with reference to FIG. 13.

At 1715, the method may include receiving a downlink transmission from the base station using a set of multiple beams via OAM beamforming. The operations of 1715 may be performed in accordance with examples as disclosed herein. In some examples, aspects of the operations of 1715 may be performed by a beamforming component 1335 as described with reference to FIG. 13.

Figure 18:
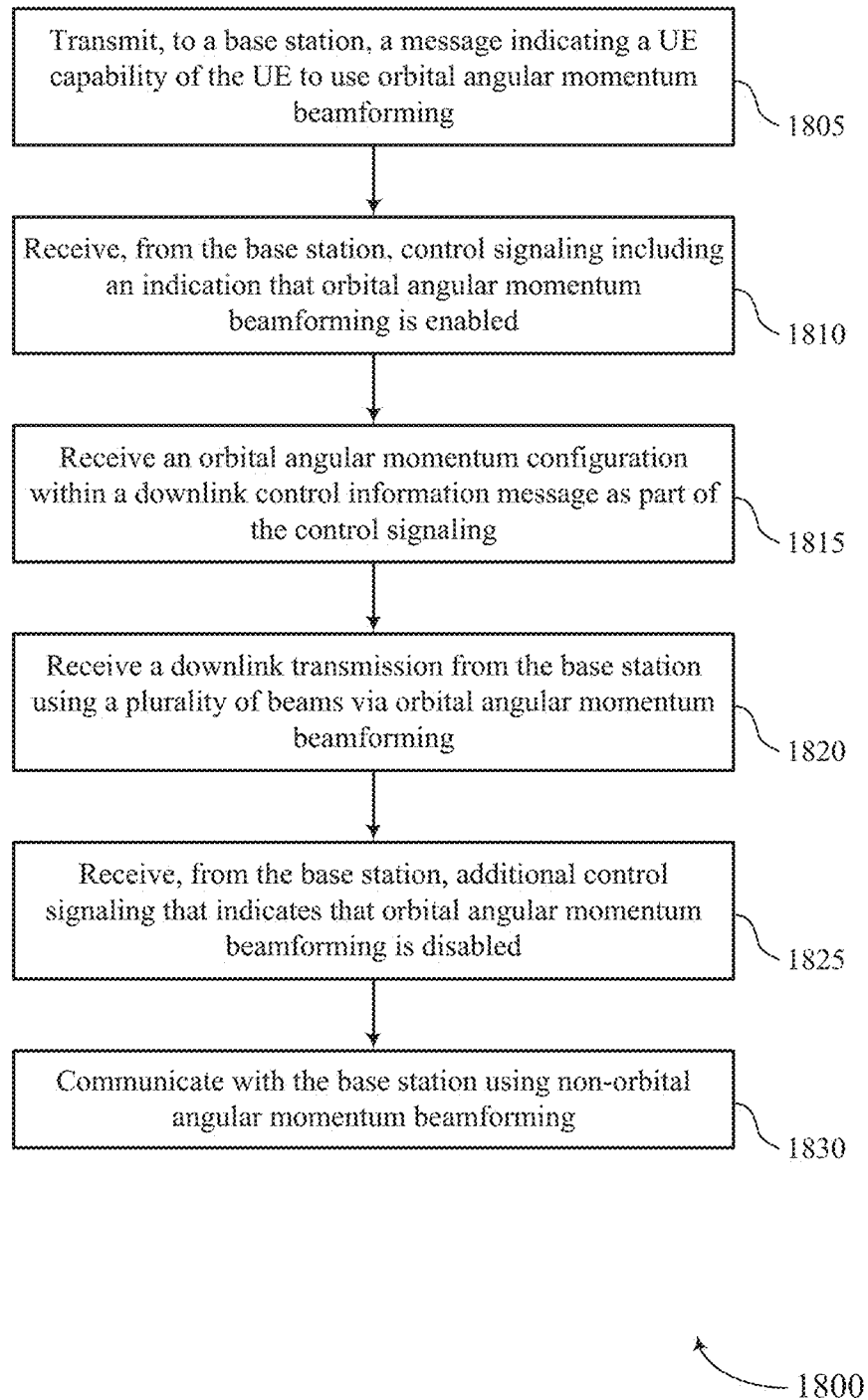

FIG. 18 shows a flowchart illustrating a method 1800 that supports OAM signaling in accordance with aspects of the present disclosure. The operations of the method 1800 may be implemented by a UE or its components as described herein. For example, the operations of the method 1800 may be performed by a UE 115 as described with reference to FIGS. 11 through 14. In some examples, a UE may execute a set of instructions to control the functional elements of the UE to perform the described functions. Additionally or alternatively, the UE may perform aspects of the described functions using special-purpose hardware.

At 1805, the method may include transmitting, to a base station, a message indicating a UE capability of the UE to use OAM beamforming. The operations of 1805 may be performed in accordance with examples as disclosed herein. In some examples, aspects of the operations of 1805 may be performed by a capability component 1325 as described with reference to FIG. 13.

At 1810, the method may include receiving, from the base station, control signaling including an indication that OAM beamforming is enabled. The operations of 1810 may be performed in accordance with examples as disclosed herein. In some examples, aspects of the operations of 1810 may be performed by a control signaling component 1330 as described with reference to FIG. 13.

At 1815, the method may include receiving an OAM configuration within a DCI message as part of the control signaling. The operations of 1815 may be performed in accordance with examples as disclosed herein. In some examples, aspects of the operations of 1815 may be performed by a control signaling component 1330 as described with reference to FIG. 13.

At 1820, the method may include receiving a downlink transmission from the base station using a set of multiple beams via OAM beamforming. The operations of 1820 may be performed in accordance with examples as disclosed herein. In some examples, aspects of the operations of 1820 may be performed by a beamforming component 1335 as described with reference to FIG. 13.

At 1825, the method may include receiving, from the base station, additional control signaling that indicates that OAM beamforming is disabled. The operations of 1825 may be performed in accordance with examples as disclosed herein. In some examples, aspects of the operations of 1825 may be performed by a OAM enabling component 1340 as described with reference to FIG. 13.

At 1830, the method may include communicating with the base station using non-OAM beamforming. The operations of 1830 may be performed in accordance with examples as disclosed herein. In some examples, aspects of the operations of 1830 may be performed by a beamforming component 1335 as described with reference to FIG. 13.

The following provides an overview of aspects of the present disclosure:

Aspect 1: A method for wireless communications at a base station, comprising: receiving, from a UE, a message indicating a UE capability to use OAM beamforming; determining, based at least in part on the UE capability and one or more communications parameters, to enable OAM beamforming for communications with the UE; transmitting, to the UE, control signaling including an indication that OAM beamforming is enabled; and transmitting a downlink transmission to the UE using a plurality of beams via OAM beamforming.

Aspect 2: The method of aspect 1, further comprising: transmitting an OAM configuration within a DCI message as part of the control signaling.

Aspect 3: The method of aspect 2, wherein the OAM configuration indicates an MCS for each beam of the plurality of beams, a resource allocation for each beam of the plurality of beams, a quantity of the plurality of beams, an OAM index for each beam of the plurality of beams, or a combination thereof.

Aspect 4: The method of any of aspects 2 through 3, wherein the OAM configuration is for either a same slot in which the control signaling is transmitted or a subsequent slot, in accordance with one or more time offset values included in the control signaling.

Aspect 5: The method of aspect 4, wherein the DCI message includes fields for configuring the same slot for OAM beamforming.

Aspect 6: The method of any of aspects 4 through 5, wherein a MAC-CE includes information for configuring the subsequent slot for OAM beamforming.

Aspect 7: The method of any of aspects 1 through 6, wherein transmitting the control signaling comprises: transmitting the indication in a preamble at a beginning of a slot that includes the downlink transmission.

Aspect 8: The method of aspect 7, wherein transmitting the control signaling further comprises: transmitting the control signaling which is indicative of an OAM index for each beam of the plurality of beams, an RNTI associated with the UE, or both.

Aspect 9: The method of any of aspects 1 through 8, wherein the communications parameters include one or more channel conditions, a channel rank, a misalignment associated with the OAM beamforming, a speed of the UE, a distance between the base station and the UE, a throughput of the UE, or a combination thereof.

Aspect 10: The method of aspect 9, further comprising: determining the misalignment associated with the channel based at least in part on receiving a misalignment report from the UE, estimating the misalignment, or a combination thereof.

Aspect 11: The method of any of aspects 1 through 10, further comprising: determining that a misalignment associated with the OAM beamforming is correctable by the base station; correcting the misalignment based at least in part on the determining; and estimating a remaining misalignment associated with the OAM beamforming, wherein determining to enable OAM beamforming is based at least in part on the remaining misalignment.

Aspect 12: The method of any of aspects 1 through 11, further comprising:
receiving, from the UE, a request message to enable OAM beamforming, wherein determining to enable OAM beamforming is based at least in part on receiving the request message.

Aspect 13: The method of any of aspects 1 through 12, wherein the control signaling comprises RRC signaling, a MAC-CE, DCI, or a combination thereof.

Aspect 14: The method of any of aspects 1 through 13, wherein the control signaling is associated with an OAM index of zero.

Aspect 15: The method of any of aspects 1 through 14, further comprising: determining to disable OAM beamforming for communications with the UE; transmitting, to the UE, additional control signaling that indicates that OAM beamforming is disabled; and communicating with the UE using non-OAM beamforming.

Aspect 16: The method of any of aspects 1 through 15, wherein the message further indicates an additional UE capability to perform digital beamforming.

Aspect 17: A method for wireless communications at a UE, comprising: transmitting, to a base station, a message indicating a UE capability of the UE to use OAM beamforming; receiving, from the base station, control signaling including an indication that OAM beamforming is enabled; and receiving a downlink transmission from the base station using a plurality of beams via OAM beamforming.

Aspect 18: The method of aspect 17, further comprising: receiving an OAM configuration within a DCI message as part of the control signaling.

Aspect 19: The method of aspect 18, wherein the OAM configuration indicates an MCS for each beam of the plurality of beams, a resource allocation for each beam of the plurality of beams, a quantity of the plurality of beams, an OAM index for each beam of the plurality of beams, or a combination thereof.

Aspect 20: The method of any of aspects 18 through 19, wherein the OAM configuration is for either a same slot in which the control signaling is transmitted or a subsequent slot, in accordance with one or more time offset values included in the control signaling.

Aspect 21: The method of aspect 20, wherein the DCI message includes fields for configuring the same slot for OAM beamforming.

Aspect 22: The method of any of aspects 20 through 21, wherein a MAC-CE includes information for configuring the subsequent slot for OAM beamforming.

Aspect 23: The method of any of aspects 17 through 22, wherein receiving the control signaling comprises: receiving the indication in a preamble at a beginning of a slot that includes the downlink transmission.

Aspect 24: The method of aspect 23, wherein receiving the control signaling further comprises: receiving the control signaling which is indicative of an OAM index for each beam of the plurality of beams, a radio network temporary identifier (RNTI) associated with the UE, or both.

Aspect 25: The method of any of aspects 17 through 24, wherein the communications parameters include one or more channel conditions, a channel rank, a misalignment associated with the OAM beamforming, a speed of the UE, a distance between the base station and the UE, a throughput of the UE, or a combination thereof.

Aspect 26: The method of aspect 25, further comprising: transmitting, to the base station, a misalignment report.

Aspect 27: The method of any of aspects 17 through 26, further comprising: transmitting, to the base station, a request message to enable OAM beamforming.

Aspect 28: The method of any of aspects 17 through 27, wherein the control signaling comprises RRC signaling, a MAC-CE, DCI, or a combination thereof.

Aspect 29: The method of any of aspects 17 through 28, wherein the control signaling is associated with an OAM index of zero.

Aspect 30: The method of any of aspects 17 through 29, further comprising: receiving, from the base station, additional control signaling that indicates that OAM beamforming is disabled; and communicating with the base station using non-OAM beamforming.

Aspect 31: The method of any of aspects 17 through 30, wherein the message further indicates an additional UE capability to perform digital beamforming.

Aspect 32: An apparatus for wireless communications at a base station, comprising a processor; memory coupled with the processor; and instructions stored in the memory and executable by the processor to cause the apparatus to perform a method of any of aspects 1 through 16.

Aspect 33: An apparatus for wireless communications at a base station, comprising at least one means for performing a method of any of aspects 1 through 16.

Aspect 34: A non-transitory computer-readable medium storing code for wireless communications at a base station, the code comprising instructions executable by a processor to perform a method of any of aspects 1 through 16.

Aspect 35: An apparatus for wireless communications at a UE, comprising a processor; memory coupled with the processor; and instructions stored in the memory and executable by the processor to cause the apparatus to perform a method of any of aspects 17 through 31.

Aspect 36: An apparatus for wireless communications at a UE, comprising at least one means for performing a method of any of aspects 17 through 31.

Aspect 37: A non-transitory computer-readable medium storing code for wireless communications at a UE, the code comprising instructions executable by a processor to perform a method of any of aspects 17 through 31.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a base station, comprising:
   receiving, from a user equipment (UE), a message indicating a UE capability to use orbital angular momentum beamforming;
   determining, based at least in part on the UE capability and one or more communications parameters, to enable orbital angular momentum beamforming for communications with the UE;
   transmitting, to the UE, control signaling including an indication that orbital angular momentum beamforming is enabled; and
   transmitting a downlink transmission to the UE using a plurality of beams via orbital angular momentum beamforming.

2. The method of claim 1, further comprising:
   transmitting an orbital angular momentum configuration within a downlink control information message as part of the control signaling.

3. The method of claim 2, wherein the orbital angular momentum configuration indicates a modulation and coding scheme for each beam of the plurality of beams, a resource allocation for each beam of the plurality of beams, a quantity of the plurality of beams, an orbital angular momentum index for each beam of the plurality of beams, or a combination thereof.

4. The method of claim 2, wherein the orbital angular momentum configuration is for either a same slot in which the control signaling is transmitted or a subsequent slot, in accordance with one or more time offset values included in the control signaling.

5. The method of claim 4, wherein the downlink control information message includes fields for configuring the same slot for orbital angular momentum beamforming.

6. The method of claim 4, wherein a medium access control (MAC) control element (CE) includes information for configuring the subsequent slot for orbital angular momentum beamforming.

7. The method of claim 1, wherein transmitting the control signaling comprises:
   transmitting the indication in a preamble at a beginning of a slot that includes the downlink transmission.

8. The method of claim 7, wherein transmitting the control signaling further comprises:
   transmitting the control signaling which is indicative of an orbital angular momentum index for each beam of the plurality of beams, a radio network temporary identifier (RNTI) associated with the UE, or both.

9. The method of claim 1, wherein the communications parameters include one or more channel conditions, a channel rank, a misalignment associated with the orbital angular momentum beamforming, a speed of the UE, a distance between the base station and the UE, a throughput of the UE, or a combination thereof.

10. The method of claim 9, further comprising:
    determining the misalignment associated with the channel based at least in part on receiving a misalignment report from the UE, estimating the misalignment, or a combination thereof.

11. The method of claim 1, further comprising:
    determining that a misalignment associated with the orbital angular momentum beamforming is correctable by the base station;
    correcting the misalignment based at least in part on the determining; and
    estimating a remaining misalignment associated with the orbital angular momentum beamforming, wherein determining to enable orbital angular momentum beamforming is based at least in part on the remaining misalignment.

12. The method of claim 1, further comprising:
receiving, from the UE, a request message to enable orbital angular momentum beamforming, wherein determining to enable orbital angular momentum beamforming is based at least in part on receiving the request message.

13. The method of claim 1, wherein the control signaling comprises radio resource control (RRC) signaling, a media access control control element (MAC-CE), downlink control information (DCI), or a combination thereof.

14. The method of claim 1, wherein the control signaling is associated with an orbital angular momentum index of zero.

15. The method of claim 1, further comprising:
determining to disable orbital angular momentum beamforming for communications with the UE;
transmitting, to the UE, additional control signaling that indicates that orbital angular momentum beamforming is disabled; and
communicating with the UE using non-orbital angular momentum beamforming.

16. The method of claim 1, wherein the message further indicates an additional UE capability to perform digital beamforming.

17. A method for wireless communications at a user equipment (UE), comprising:
transmitting, to a base station, a message indicating a UE capability of the UE to use orbital angular momentum beamforming;
receiving, from the base station, control signaling including an indication that orbital angular momentum beamforming is enabled; and
receiving a downlink transmission from the base station using a plurality of beams via orbital angular momentum beamforming.

18. The method of claim 17, further comprising:
receiving an orbital angular momentum configuration within a downlink control information message as part of the control signaling.

19. The method of claim 18, wherein the orbital angular momentum configuration indicates a modulation and coding scheme for each beam of the plurality of beams, a resource allocation for each beam of the plurality of beams, a quantity of the plurality of beams, an orbital angular momentum index for each beam of the plurality of beams, or a combination thereof.

20. The method of claim 18, wherein the orbital angular momentum configuration is for either a same slot in which the control signaling is transmitted or a subsequent slot, in accordance with one or more time offset values included in the control signaling.

21. The method of claim 20, wherein the downlink control information message includes fields for configuring the same slot for orbital angular momentum beamforming.

22. The method of claim 20, wherein a medium access control (MAC) control element (CE) includes information for configuring the subsequent slot for orbital angular momentum beamforming.

23. The method of claim 17, wherein receiving the control signaling comprises:
receiving the indication in a preamble at a beginning of a slot that includes the downlink transmission.

24. The method of claim 23, wherein receiving the control signaling further comprises:
receiving the control signaling which is indicative of an orbital angular momentum index for each beam of the plurality of beams, a radio network temporary identifier (RNTI) associated with the UE, or both.

25. The method of claim 17, wherein the communications parameters include one or more channel conditions, a channel rank, a misalignment associated with the orbital angular momentum beamforming, a speed of the UE, a distance between the base station and the UE, a throughput of the UE, or a combination thereof.

26. The method of claim 25, further comprising:
transmitting, to the base station, a misalignment report.

27. The method of claim 17, further comprising:
transmitting, to the base station, a request message to enable orbital angular momentum beamforming.

28. The method of claim 17, further comprising:
receiving, from the base station, additional control signaling that indicates that orbital angular momentum beamforming is disabled; and
communicating with the base station using non-orbital angular momentum beamforming.

29. An apparatus for wireless communications at a base station, comprising:
a processor;
memory coupled with the processor; and
instructions stored in the memory and executable by the processor to cause the apparatus to:
receive, from a user equipment (UE), a message indicating a UE capability to use orbital angular momentum beamforming;
determine, based at least in part on the UE capability and one or more communications parameters, to enable orbital angular momentum beamforming for communications with the UE;
transmit, to the UE, control signaling including an indication that orbital angular momentum beamforming is enabled; and
transmit a downlink transmission to the UE using a plurality of beams via orbital angular momentum beamforming.

30. An apparatus for wireless communications at a user equipment (UE), comprising:
a processor;
memory coupled with the processor; and
instructions stored in the memory and executable by the processor to cause the apparatus to:
transmit, to a base station, a message indicating a UE capability of the UE to use orbital angular momentum beamforming;
receive, from the base station, control signaling including an indication that orbital angular momentum beamforming is enabled; and
receive a downlink transmission from the base station using a plurality of beams via orbital angular momentum beamforming.

* * * * *